(12) United States Patent
Morie et al.

(10) Patent No.: US 12,061,877 B2
(45) Date of Patent: Aug. 13, 2024

(54) ARITHMETIC LOGIC UNIT, MULTIPLY-ACCUMULATE OPERATION DEVICE, MULTIPLY-ACCUMULATE OPERATION SYSTEM, AND MULTIPLY-ACCUMULATE OPERATION METHOD

(71) Applicant: Sony Group Corporation, Tokyo (JP)

(72) Inventors: Takashi Morie, Fukuoka (JP); Hakaru Tamukoh, Fukuoka (JP); Quan Wang, Fukuoka (JP); Yasushi Fujinami, Tokyo (JP)

(73) Assignee: Sony Group Corporation, Tokyo (JP)

( * ) Notice: Subject to any disclaimer, the term of this patent is extended or adjusted under 35 U.S.C. 154(b) by 758 days.

(21) Appl. No.: 17/258,965

(22) PCT Filed: Jul. 12, 2019

(86) PCT No.: PCT/JP2019/027650
§ 371 (c)(1),
(2) Date: Jan. 8, 2021

(87) PCT Pub. No.: WO2020/017444
PCT Pub. Date: Jan. 23, 2020

(65) Prior Publication Data
US 2021/0318853 A1 Oct. 14, 2021

(30) Foreign Application Priority Data

Jul. 17, 2018 (JP) .................................. 2018-134591

(51) Int. Cl.
*G06F 7/544* (2006.01)
*G06F 7/60* (2006.01)

(52) U.S. Cl.
CPC .............. *G06F 7/5443* (2013.01); *G06F 7/60* (2013.01)

(58) Field of Classification Search
CPC .......... G06F 7/50; G06F 7/523; G06F 7/5443; G06F 7/60; G06F 17/153; G06F 17/16;
(Continued)

(56) References Cited

U.S. PATENT DOCUMENTS

| 2014/0289179 | A1* | 9/2014 | Di Castro | G06N 3/049 708/835 |
| 2018/0046906 | A1* | 2/2018 | Dally | G06F 7/5443 |
| 2019/0171418 | A1 | 6/2019 | Morie et al. | |

FOREIGN PATENT DOCUMENTS

| JP | H05061499 A | 3/1993 |
| JP | 05-290014 A | 11/1993 |

(Continued)

OTHER PUBLICATIONS

M. Yamaguchi et al., An Energy-efficient Time-domain Analog CMOS BinaryConnect Neural Network Processor Based on a Pulse-width Modulation Approach, IEEE Access Multidisciplinary Rapid Review Open Access Journal, 2017 (Year: 2017).*

(Continued)

*Primary Examiner* — Emily E Larocque
(74) *Attorney, Agent, or Firm* — Michael Best & Friedrich LLP

(57) ABSTRACT

An arithmetic logic unit according to an embodiment of the present technology includes: a plurality of input lines; and a multiply-accumulate operation device. Pulse signals corresponding to input values are input to the plurality of input lines. The multiply-accumulate operation device includes a plurality of multiplication units that generates, on the basis of the pulse signals input to each of the plurality of input lines, charges corresponding to multiplication values obtained by multiplying the input values by weight values, and an output unit that outputs a multiply-accumulate signal representing a sum of the multiplication values by accumulating the charges corresponding to the multiplication values (Continued)

generated by each of the plurality of multiplication units. A value of at least one of the input value or the weight value is limited.

20 Claims, 9 Drawing Sheets

(58) Field of Classification Search
CPC .......... G06N 3/065; G06N 3/049; G06G 7/14; G06G 7/16
See application file for complete search history.

(56) References Cited

FOREIGN PATENT DOCUMENTS

| JP | 10-222491 A | 8/1998 |
|---|---|---|
| JP | 2001-285137 A | 10/2001 |
| TW | 201617857 A | 5/2016 |
| WO | 2018/034163 A1 | 2/2018 |

OTHER PUBLICATIONS

Lin et al., Analysis and Simulation of Capacitor-Less ReRAM-Based Stochastic Neurons for the in-Memory Spiking Neural Network, IEEE Transactions on Biomedical Circuits and Systems, vol. 12, No. 5, 2018, first published Jul. 16, 2018 (Year: 2018).*

Y. Wang et al., Group Scissor: Scaling Neuromorphic Computing Design to Large Neural Networks, arXiv:1702.03443v2 [cs.NE], 2017 (Year: 2017).*

M. Kang et al., A 481pJ/decision 3.4M decision/s Multifunction Deep In-memory Inference Processor, arXiv:1610.07501v1 [cs.AR], 2016 (Year: 2016).*

International Search Report (PCT/ISA/210), International Application No. PCT/JP2019/027650, dated Aug. 27, 2019.

Written Opinion of the International Search Authority (PCT/ISA/237), International Application No. PCT/JP2019/027650, dated Sep. 10, 2019.

Notification of Transmittal of the International Search Report and the Written Opinion of the International Searching Authority, or the Declaration (PCT/ISA/220), International Application No. PCT/JP2019/027650, dated Sep. 10, 2019.

* cited by examiner

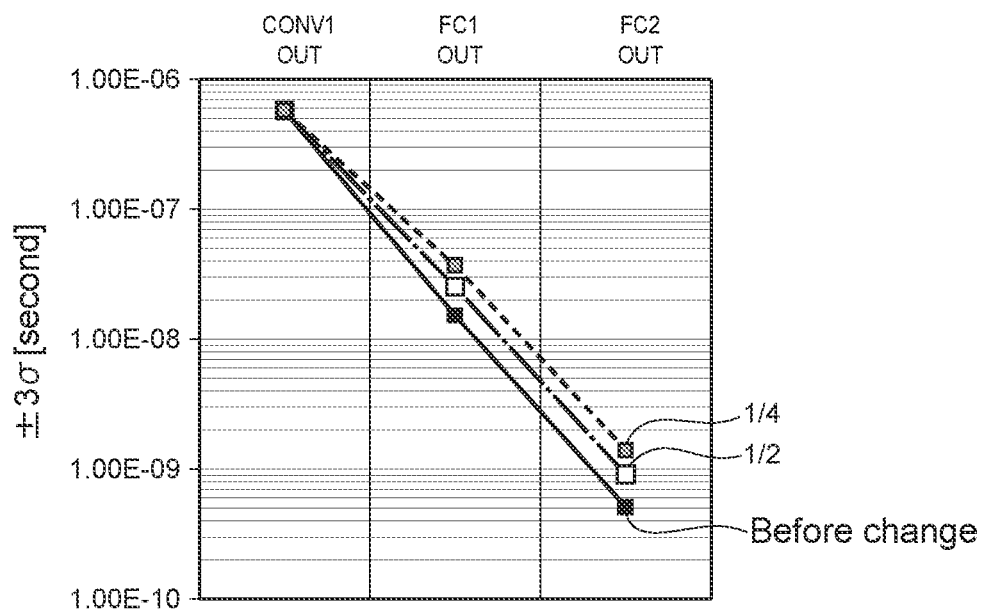
FIG.13
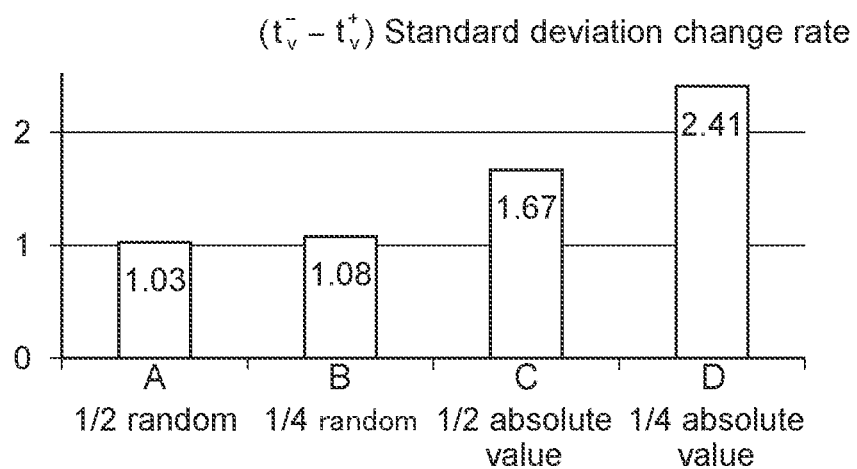
FIG.14
| | y Standard deviation change rate | $(t_v^- - t_v^+)$ Standard deviation change rate | $(t_v^- - t_v^+)$ Standard deviation change rate (Normalized) |
|---|---|---|---|
| 1/2 absolute value | 0.84 | 1.67 | 2.06 (=1.67/0.84) |
| 1/4 absolute value | 0.61 | 2.41 | 3.95 (=2.41/0.61) |
FIG.15

ARITHMETIC LOGIC UNIT, MULTIPLY-ACCUMULATE OPERATION DEVICE, MULTIPLY-ACCUMULATE OPERATION SYSTEM, AND MULTIPLY-ACCUMULATE OPERATION METHOD

TECHNICAL FIELD

The present technology relates to an arithmetic logic unit, a multiply-accumulate operation device, a multiply-accumulate operation system, and a multiply-accumulate operation method that are applicable to a multiply-accumulate operation using an analog system.

BACKGROUND ART

For example, Patent Literature 1 describes an analog circuit in which processing of a multiply-accumulate operation is performed by an analog system. In this analog circuit, a weight corresponding to each of a plurality of electrical signals is set. Further, charges corresponding to the corresponding electrical signal and the weight are output, and the output charges are appropriately accumulated in a capacitor. Then, a value to be calculated representing the multiply-accumulate result is calculated on the basis of the voltage of the capacitor in which charges are accumulated. As a result, the power consumed by the multiply-accumulate operation can be reduced as compared with processing using a digital system, for example (paragraphs [0003], [0049] to [0053], and [0062] of the specification and FIG. 4 of Patent Literature 1, etc.).

CITATION LIST

Patent Literature

Patent Literature 1: WO 2018/034163

DISCLOSURE OF INVENTION

Technical Problem

The use of such a circuit using an analog system is expected to lead to lower power consumption of a neural network or the like, and there is a need for a technology capable of detecting an operation result with high accuracy.

In view of the circumstances as described above, it is an object of the present technology to provide an arithmetic logic unit, a multiply-accumulate operation device, a multiply-accumulate operation system, and a multiply-accumulate operation method that are capable of detecting an operation result with high accuracy in a circuit of an analog system performing a multiply-accumulate operation.

Solution to Problem

In order to achieve the above-mentioned object, an arithmetic logic unit according to an embodiment of the present technology includes: a plurality of input lines; and a multiply-accumulate operation device.

Pulse signals corresponding to input values are input to the plurality of input lines.

The multiply-accumulate operation device includes a plurality of multiplication units that generates, on the basis of the pulse signals input to each of the plurality of input lines, charges corresponding to multiplication values obtained by multiplying the input values by weight values, and an output unit that outputs a multiply-accumulate signal representing a sum of the multiplication values by accumulating the charges corresponding to the multiplication values generated by each of the plurality of multiplication units.

A value of at least one of the input value or the weight value is limited.

In this arithmetic logic unit, pulse signals corresponding to input values are input from a plurality of input lines, and charges corresponding to multiplication values of the input values and weight values are generated on the basis of the pulse signals. The generated charges are accumulated, and a multiply-accumulate signal representing the sum of the multiplication values is output. At this time, a value of at least one of the input value or the weight value is limited. By limiting the respective values, for example, it is possible to adjust the sum of the multiplication values. As a result, it is possible to detect an operation result with high accuracy in a circuit of an analog system performing a multiply-accumulate operation.

The value of the at least one of the input value or the weight value may be limited to fall within a predetermined value range.

As a result, the value of the input value or the weight value is limited to fall within the predetermined value range, and it is possible to reduce the sum of the multiplication values, for example. As a result, it is possible to detect an operation result with high accuracy.

The predetermined value range may include a plurality of limit values. In this case, the value of the at least one of the input value or the weight value may be set to one of the plurality of limit values.

As a result, for example, the input value and the weight value are limited to discrete values, and it is possible to reduce the sum of the multiplication values. As a result, it is possible to detect an operation result with high accuracy.

The plurality of limit values may include zero.

As a result, the sum of the multiplication values is significantly suppressed, and it is possible to express the sum of the multiplication values with high accuracy, for example. As a result, it is possible to sufficiently improve the detection accuracy of an operation result.

The plurality of limit values may include a positive limit value and a negative limit value that have absolute values equal to each other.

As a result, it is possible to limit the respective values even in the case where positive and negative weight values or signal values are used, for example.

The weight value may be limited by first processing of setting the weight value on the basis of a first value that is an absolute value of a value to be the weight value.

As a result, for example, it is possible to appropriately limit the weight value in accordance with the magnitude of the absolute value of the value to be the weight value. As a result, it is possible to appropriately reduce the sum of the multiplication values, or the like.

The first processing may be processing of setting, where the first value is a first threshold value or less, the weight value to zero.

As a result, it is possible to make, in the case where the value to be the weight value is sufficiently small, the multiplication value with the weight value zero. As a result, it is possible to sufficiently improve the detection accuracy of an operation result.

The first processing may be processing of setting the weight value to zero at a first ratio in order from the smallest first value, the weight value being set for each of the plurality of multiplication units.

As a result, it is possible to make, in the case where the value to be the weight value is sufficiently small, the multiplication value with the weight value zero. As a result, it is possible to sufficiently improve the detection accuracy of an operation result.

The input value may be limited by second processing of setting the input value on the basis of a second value that is an absolute value of a value to be the input value.

As a result, for example, it is possible to appropriately limit the input value in accordance with the magnitude of the absolute value of the value to be the input value. As a result, it is possible to appropriately reduce the sum of the multiplication values, or the like.

The second processing may be processing of setting, where the second value is a second threshold value or less, the input value to zero.

As a result, it is possible to make, in the case where the value to be the input value is sufficiently small, the multiplication value with the input value zero. As a result, it is possible to sufficiently improve the detection accuracy of an operation result.

The second processing may be processing of setting the input value to zero at a second ratio in order from the smallest second value, the input value being represented by the pulse signal input to each of the plurality of multiplication units.

As a result, it is possible to make, in the case where the value to be the input value is sufficiently small, the multiplication value with the input value zero. As a result, it is possible to sufficiently improve the detection accuracy of an operation result.

The arithmetic logic unit may further include a limiting unit that executes, using an absolute value of the sum of the multiplication values represented by the multiply-accumulate signal as the second value, the second limitation processing on the basis of the multiply-accumulate signal.

As a result, it is possible to generate a multiply-accumulate signal whose value is limited. By using this multiply-accumulate signal, it is possible to suppress the multiplication value or the like in the multiply-accumulate operation device in the subsequent stage.

The pulse signal may be input to each of the plurality of input lines within a predetermined input period. In this case, the output unit may output a multiply-accumulate signal representing the sum of the multiplication values within a predetermined output period.

As a result, it is possible to appropriately execute a multiply-accumulate operation within the set period.

The input value may be a value represented by a first input value and a second input value. In this case, the plurality of input lines may include a plurality of pairs of input lines, each of the pairs including a first input line and a second input line, a first pulse signal representing the first input value being input to the first input line, a second pulse signal representing the second input value being input to the second input line.

As a result, it is possible to easily execute a multiply-accumulate operation using positive and negative weight values, for example.

The pulse signal may be a signal representing the input value using at least one of timing of a pulse or a pulse width.

As a result, it is possible to easily execute processing of multiplying an input value and a weight value on the basis of the pulse signal.

A multiply-accumulate operation device according to an embodiment of the present technology includes: a plurality of multiplication units; and an output unit.

The plurality of multiplication units generates, on the basis of pulse signals input to each of a plurality of input lines, charges corresponding to multiplication values obtained by multiplying the input values by weight values.

The output unit outputs a multiply-accumulate signal representing a sum of the multiplication values by accumulating the charges corresponding to the multiplication values generated by each of the plurality of multiplication units.

A value of at least one of the input value or the weight value is limited.

A multiply-accumulate operation system according to an embodiment of the present technology includes: a plurality of input lines; a plurality of multiply-accumulate operation devices; and a network circuit.

Pulse signals corresponding to input values are input to the plurality of input lines.

The plurality of multiply-accumulate operation devices includes a plurality of multiplication units that generates, on the basis of the pulse signals input to each of the plurality of input lines, charges corresponding to multiplication values obtained by multiplying the input values by weight values, and an output unit that outputs a multiply-accumulate signal representing a sum of the multiplication values by accumulating the charges corresponding to the multiplication values generated by each of the plurality of multiplication units.

The network circuit is configured by connecting the plurality of multiply-accumulate operation devices.

A value of at least one of the input value or the weight value is limited.

A multiply-accumulate operation method according to an embodiment of the present technology includes: inputting pulse signals corresponding to input values to a plurality of input lines.

On the basis of the pulse signals input to each of the plurality of input lines, charges corresponding to multiplication values obtained by multiplying the input values by weight values are generated.

A multiply-accumulate signal representing a sum of the multiplication values is output by accumulating the charges corresponding to the multiplication values.

A value of at least one of the input value or the weight value is limited.

A multiply-accumulate operation system according to an embodiment of the present technology includes: a plurality of input lines; a plurality of multiply-accumulate operation devices; and a limitation processing unit.

Pulse signals corresponding to input values are input to the plurality of input lines.

The plurality of multiply-accumulate operation devices includes a plurality of multiplication units that generates, on the basis of the pulse signals input to each of the plurality of input lines, charges corresponding to multiplication values obtained by multiplying the input values by weight values, and an output unit that outputs a multiply-accumulate signal representing a sum of the multiplication values by accumulating the charges corresponding to the multiplication values generated by each of the plurality of multiplication units.

The limitation processing unit limits a value of at least one of the input value or the weight value before each of the plurality of multiplication units generates charges corresponding to the multiplication values.

A multiply-accumulate operation system according to an embodiment of the present technology includes: a plurality of input lines; a plurality of multiply-accumulate operation devices; a network circuit; and a limitation processing unit.

Pulse signals corresponding to input values are input to the plurality of input lines.

The plurality of multiply-accumulate operation devices includes a plurality of multiplication units that generates, on the basis of the pulse signals input to each of the plurality of input lines, charges corresponding to multiplication values obtained by multiplying the input values by weight values, and an output unit that outputs a multiply-accumulate signal representing a sum of the multiplication values by accumulating the charges corresponding to the multiplication values generated by each of the plurality of multiplication units.

The network circuit is configured by connecting the plurality of multiply-accumulate operation devices.

The limitation processing unit limits a value of at least one of the input value or the weight value before each of the plurality of multiplication units generates charges corresponding to the multiplication values.

The value of the at least one of the input value or the weight value is limited by the limitation processing unit via the network circuit.

Advantageous Effects of Invention

As described above, in accordance with the present technology, it is possible to detect an operation result with high accuracy in a circuit of an analog system performing a multiply-accumulate operation. It should be noted that the effects described here are not necessarily limitative, and any of the effects described in the present disclosure may be provided.

BRIEF DESCRIPTION OF DRAWINGS

FIG. 13 is a graph showing the change in the difference value of the timing output from the analog circuit.

FIG. 14 is a graph showing the change rates of standard deviations σ of the difference values.

FIG. 15 is a table showing the change rates of the standard deviations σ of a multiply-accumulate result and the difference values.

MODE(S) FOR CARRYING OUT THE INVENTION

Hereinafter, embodiments according to the present technology will be described with reference to the drawings.

First Embodiment

Configuration of Arithmetic Logic Unit

Figure 1:
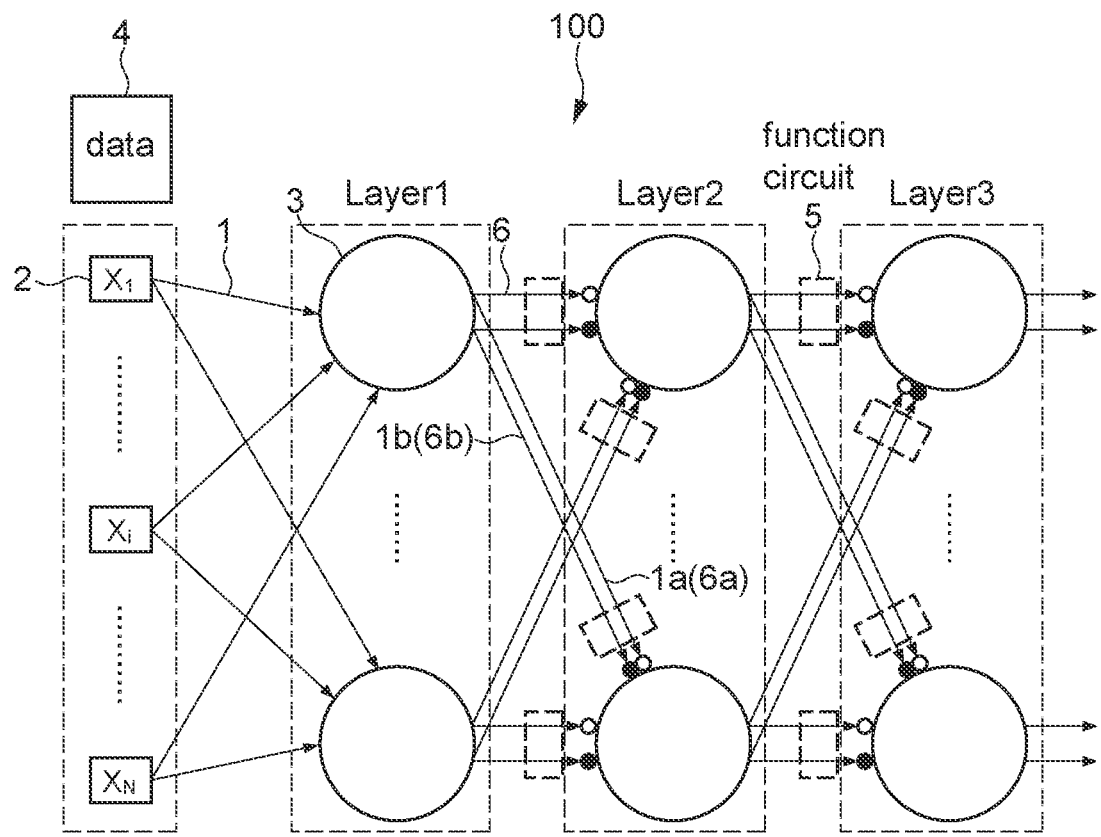
FIG. 1 is a schematic diagram showing a configuration example of an arithmetic logic unit according to a first embodiment of the present technology.

FIG. 1 is a schematic diagram showing a configuration example of an arithmetic logic unit according to a first embodiment of the present technology. An arithmetic logic unit 100 is an arithmetic logic unit using an analog system, which executes predetermined operation processing including a multiply-accumulate operation. By using the arithmetic logic unit 100, for example, it is possible to execute operation processing according to a mathematical model such as a neural network.

The arithmetic logic unit 100 includes a plurality of signal lines 1, a plurality of input units 2, and a plurality of analog circuits 3. Each of the signal lines 1 is a line that transmits an electrical signal of a predetermined system, and an electrical signal corresponding to a signal value is input thereto. As the electrical signal, for example, an analog signal representing a signal value using an analog amount such as the timing and width of the pulse is used. The directions in which electrical signals are transmitted are schematically illustrated in FIG. 1 by means of arrows. In this embodiment, the electrical signal corresponds to the pulse signal. In this embodiment, the analog circuit 3 corresponds to the multiply-accumulate operation device.

For example, the plurality of signal lines 1 is connected to one analog circuit 3. The signal line 1 that transmits an electrical signal to the analog circuit 3 is an input signal line from which an electrical signal is input for the analog circuit 3 to which the signal line 1 is connected. Further, the signal line 1 that transmits an electrical signal output from the analog circuit 3 is an output signal line to which an electrical signal is output for the analog circuit 3 that outputs an electrical signal. In this embodiment, the input signal line corresponds to the input line.

Each of the plurality of input units 2 generates a plurality of electrical signals corresponding to input data 4. The input data 4 is, for example, data to be processed using a neural network or the like implemented by the arithmetic logic unit 100. Therefore, it can also be said that the respective signal values of the plurality of electrical signals corresponding to the input data 4 are input values to the arithmetic logic unit 100.

As the input data 4, for example, arbitrary data such as image data, audio data, and statistical data to be processed by the arithmetic logic unit 100 is used. For example, in the case where image data is used as the input data 4, an electrical signal having a signal value corresponding to the pixel value (RGB value, luminance value, etc.) of each of the pixels of the image data is generated. In addition, an electrical signal corresponding to the input data 4 may be appropriately generated in accordance with the type of the input data 4 and the content of the processing by the arithmetic logic unit 100.

The analog circuit 3 is a multiply-accumulate operation circuit of an analog system performing a multiply-accumulate operation on the basis of the electrical signal to be input. The multiply-accumulate operation is an operation of adding a plurality of multiplication values obtained by multiplying a plurality of input values (signal values) by weight values. Therefore, it can also be said that the multiply-accumulate operation is processing of calculating the sum (hereinafter, referred to as the multiply-accumulate result) of the respective multiplication values.

In the following, assumption is made that the total number of electrical signals input to one analog circuit 3 is N. Note that the number N of the electrical signals to be input to each of the analog circuits 3 is appropriately set for each of the circuits in accordance with, for example, the model, accuracy, and the like of operation processing.

In the analog circuit, for example, $w_i \cdot x_i$, which is a multiplication value of a signal value (input value) $x_i$ represented by an electrical signal input from the i-th input signal line and a weight value $w_i$ corresponding to the signal value $x_i$, is calculated. Here, i is a natural number equal to or less than N (i=1, 2, ..., N). The operation of the multiplication value is executed for each electrical signal (input signal line) and N multiplication values are calculated. The sum of the N multiplication values is calculated as a multiply-accumulate result (sum of the N multiplication values). Therefore, the multiply-accumulate result calculated by one analog circuit 3 is expressed by the following formula.

$$\sum_{i=1}^{N} w_i \cdot x_i \qquad [\text{Math. 1}]$$

In this embodiment, the weight value $w_i$ whose possible values are limited in advance is used. The weight value $w_i$ is, for example, calculated in advance and set for the analog circuit 3 (the synapse circuit 8 described below). For example, the weight value $w_i$ whose value is limited is calculated using a computer or the like so that a neural network or the like mounted on the arithmetic logic unit 100 appropriately executes processing. As described above, in the arithmetic logic unit 100, the value of the weight value $w_i$ is limited. As described below, in this embodiment, the value of the weight value $w_i$ is limited so as to fall within a predetermined value range.

The signal value $x_i$ is, for example, a value represented by an electrical signal output from each of the input units 2 or a multiply-accumulate result output from each of the analog circuits 3. Therefore, it can be said that each of the input units 2 and the analog circuits 3 functions as a signal source that outputs the signal value $x_i$. Note that the method of transmitting the signal value $x_i$, and the like are not limited. For example, an arbitrary electrical signal for transmitting the signal value $x_i$ may be used so that the operation shown in (Math. 1) can be performed.

As shown in FIG. 1, in this embodiment, a pair of electrical signals are output from one analog circuit 3. The multiply-accumulate result (the signal value $x_i$) in the analog circuit 3, or the like can be represented by the pair of electrical signals. Note that the present technology is applicable even in a configuration in which a single electrical signal is used to transmit one signal value $x_i$.

The pair of electrical signals include, for example, a positive electrical signal representing a positive signal value $x_i^+$ and a negative electrical signal representing a negative signal value $x_i^-$. For example, the positive signal value $x_i^+$ and the negative signal value $x_i^-$ are each a real number of zero or more, and a difference value $(x_i^+ - x_i^-)$ obtained by subtracting the negative signal value $x_i^-$ from the positive signal value $x_i^+$ is the signal value $x_i$. In another aspect, it can be said that one signal value $x_i$ is a value represented by the positive and negative signal values $x_i^+$ and $x_i^-$. In this embodiment, the positive signal value $x_i^+$ corresponds to the first input value, and the negative signal value $x_i^-$ corresponds to the second input value.

For example, the analog circuit 3 outputs, as the positive electrical signal, an electrical signal representing a positive multiply-accumulate result (the positive signal value $x_i^+$) that is the total sum of positive multiplication values, and outputs, as the negative electrical signal, an electrical signal representing a negative multiply-accumulate result (the negative signal value $x_i^-$) that is the total sum of negative multiplication values.

A plurality of positive signal lines 1a that transmits the positive electrical signal and a plurality of negative signal lines 1b that transmits the negative electrical signal are connected to the output side of one analog circuit 3. The same positive electrical signal is input to the plurality of positive signal lines 1a. Further, the same negative electrical signal is input to the plurality of negative signal lines 1b. In FIG. 1, the positive signal line 1a (positive input signal line 6a) is connected to a connection point indicated by a white circle of the analog circuit 3. Further, the negative signal line 1b (negative input signal line 6b) is connected to a connection point indicated by a black circle of the analog circuit 3.

Further, a configuration in which a pair of electrical signals are output from each of the input units 2 (signal source) may be used. For example, the input unit 2 outputs, as the positive electrical signal, an electrical signal representing a signal value corresponding to the input data 4, and outputs, as the negative electrical signal, an electrical signal whose signal value is zero. For example, the input unit 2 can be configured as described above.

As described above, in this embodiment, a plurality of pairs of input signal lines 6 are used, each of the pairs including the positive input signal line 6a and the negative input signal line 6a, the positive electrical signal representing the positive signal value $x_i^+$ being input to the positive input signal line 6a, the negative electrical signal representing the negative signal value $x_i^-$ being input to the negative input signal line 6a.

As shown in FIG. 1, the arithmetic logic unit 100 has a hierarchical structure in which the plurality of analog circuits 3 is provided in each of a plurality of layers. By configuring the layer structure of the analog circuits 3, for example, a multi-layer perceptron type neural network or the like is constructed. For example, by connecting the plurality of analog circuits 3 and the network circuit to each other, it is possible to construct a multiply-accumulate operation system. The number of the analog circuits 3 provided in each layer, the number of layers, and the like are appropriately designed so that desired processing can be executed. In the following, the number of the analog circuits 3 provided in the layer of the j-th stage will be referred to as $N_j$ in some cases.

For example, N electrical signals generated by N input units 2 are input to each of the analog circuits 3 provided in the layer of the first stage (the lowest layer). The multiply-accumulate result relating to the signal value $x_i$ of the input data is calculated by each of the analog circuits 3 in the first stage, and output to the analog circuit 3 provided in the next layer (second stage).

$N_1$ electrical signals representing the multiply-accumulate results calculated in the first stage are input to the respective analog circuits 3 provided in the second layer (upper layer). Therefore, each of the multiply-accumulate results calculated in the first stage is the signal value $x_i$ (the positive and negative signal values $x_i^+$ and $x_i^-$) of the electrical signal when viewed from each of the analog circuits 3 in the second stage. The multiply-accumulate result relating to the signal value $x_i$ output from the first stage is calculated by each of the analog circuits 3 in the second stage, and output to the analog circuit 3 in the upper layer.

In this way, in the arithmetic logic unit 100, the multiply-accumulate result of the analog circuit 3 in the upper layer is calculated on the basis of the multiply-accumulate result calculated by the analog circuit 3 in the lower layer. Such processing is executed a plurality of times, and the processing result is output from the analog circuit 3 included in the top layer (the layer of the third stage in FIG. 1). As a result, for example, processing such as image recognition of determining that the object is a cat on the basis of image data (the input data 4) obtained by imaging the cat can be performed.

Note that the method of connecting the analog circuits 3 to each other, and the like are not limited, and, for example, the plurality of analog circuits 3 may be appropriately connected to each other so that desired processing can be performed. For example, the present technology is applicable even in the case where the analog circuits 3 are connected to each other so as to constitute another structure different from the hierarchical structure.

In the above description, the configuration in which a multiply-accumulate result calculated in the lower layer is input to the upper layer as it is has been described. The present invention is not limited thereto. For example, conversion processing or the like may be executed on the multiply-accumulate result. For example, in the neural network model, processing such as performing non-linear conversion on the multiply-accumulate result of each of the analog circuits 3 using an activation function, and inputting the conversion result to the upper layer is executed.

In the arithmetic logic unit 100, for example, a function circuit 5 that performs non-linear transformation by an activation function on the electrical signal is used. The function circuit 5 is, for example, a circuit that is provided between a lower layer and an upper layer, appropriately converts a signal value of an electrical signal to be input, and outputs an electrical signal according to a result of the conversion. The function circuit 5 is provided for each of the signal lines 1, for example. The number, arrangement, and the like of the function circuits 5 are appropriately set in accordance with, for example, the mathematical model implemented in the arithmetic logic unit 100.

Note that in FIG. 1, as an example, the function circuit 5 is disposed in the input signal line to which an electrical signal is input in the analog circuit 3 included in the layer of the third stage. It goes without saying that the function circuit 5 may be disposed in all of the input signal lines, or the function circuit 5 may be selectively disposed in a part of the input signal lines.

As the activation function, for example, a ReLU function (ramp function) or the like is used. In the ReLU function, the signal value $x_i$ is output as it is in the case where, for example, the signal value $x_i$ is 0 or more, and 0 is output in other cases. As a result, it is possible to significantly improve the processing accuracy of the arithmetic logic unit 100.

Figure 2:
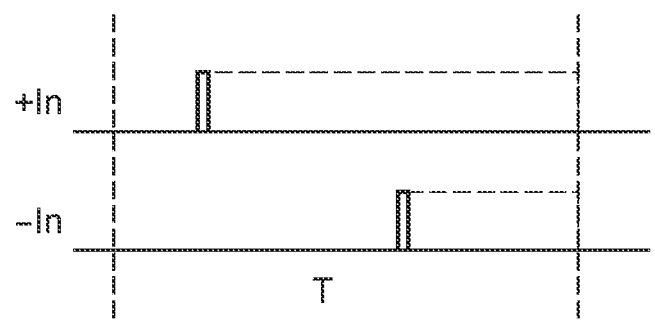
FIG. 2 is a schematic diagram showing an example of an electrical signal input to an analog circuit.

FIG. 2 is a schematic diagram showing an example of the electrical signal input to the analog circuit 3. In FIG. 2, a graph indicating waveforms of a pair of electrical signals is schematically illustrated. The horizontal axis of the graph represents the time axis, and the vertical axis represents the voltage of the electrical signal. Note that the time axis of each graph is common.

FIG. 2 shows an example of the waveform of the electrical signal of a spike timing system (hereinafter, referred to as the TACT system). In the TACT system, a signal representing the signal value $x_i$ using timing of a pulse as an electrical signal is used. For example, with reference to predetermined timing, the earlier the timing when the pulse is input, the larger the signal value $x_i$ represented by the pulse.

In this embodiment, an electrical signal (pulse) is input to each of the plurality of input signal lines 6 within a predetermined input period T. The signal value $x_i$ is represented by the input timing of the pulse in this input period T. Therefore, for example, the pulse input at the same time as the beginning of the input period T represents the largest signal value $x_i$.

Note that in FIG. 2, a rectangular pulse having a predetermined pulse width is illustrated as an electrical signal. The present technology is not limited thereto, and, for example, a continuous pulse that rises at certain timing and maintains the ON-level until a multiply-accumulate result is obtained may be used as an electrical signal.

It can be said that the analog circuit 3 according to this embodiment is the analog circuit 3 of the TACT system. In this embodiment, it is possible to execute a time-axis analog multiply-accumulate operation using the analog circuit 3 of the TACT system.

Figure 3:
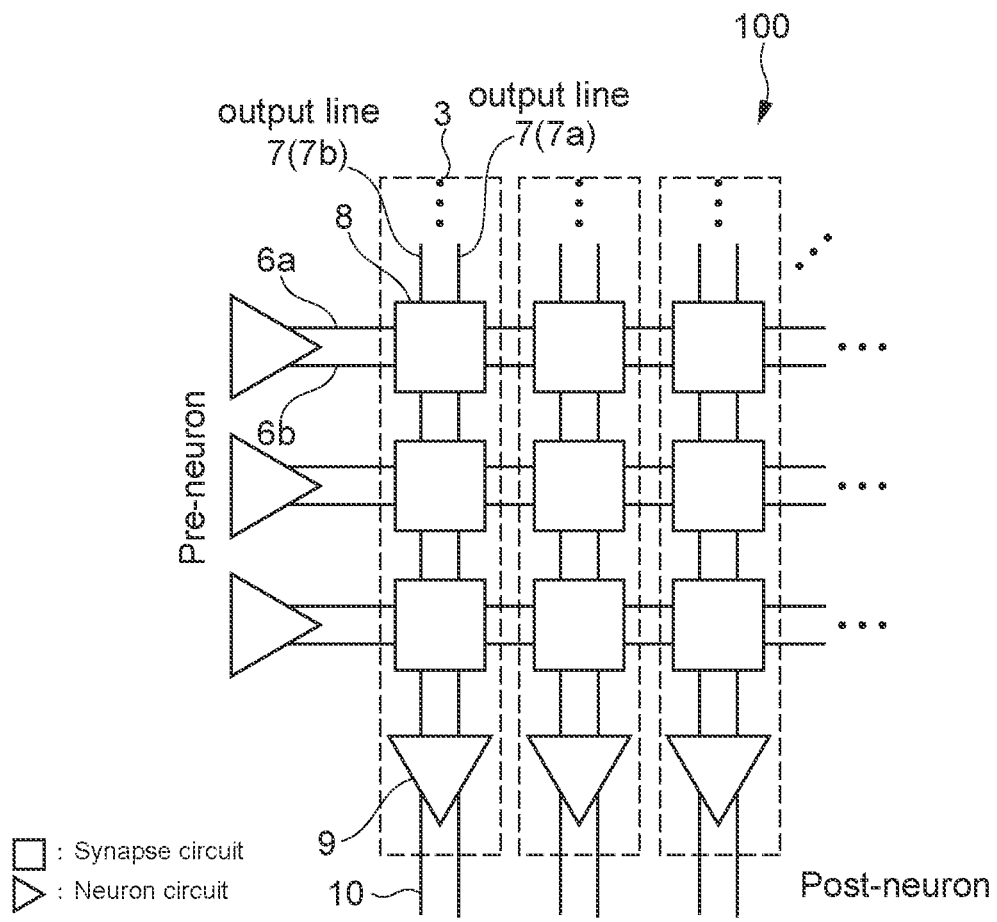
FIG. 3 is a schematic diagram showing a specific configuration example of an arithmetic logic unit.

FIG. 3 is a schematic diagram showing a specific configuration example of the arithmetic logic unit 100. In FIG. 3, the plurality of analog circuits 3 provided in one layer is schematically illustrated.

The analog circuits 3 each include a pair of output lines 7, a plurality of synapse circuits 8, and a neuron circuit 9. As shown in FIG. 2, the arithmetic logic unit 100 is a circuit having a cross bar configuration in which the input signal line 6 and each of the output lines 7 are arranged perpendicularly to each other. Further, in the arithmetic logic unit 100, the positive input signal line 6a and the negative input signal line 6b are connected to each of the synapse circuits 8.

The pair of output lines 7 are spaced apart from each other along the extension direction. The pair of output lines 7 include a positive output line 7a and a negative output line 7b. Each of the output lines 7a and 7b is connected to the neuron circuit 9 via the plurality of synapse circuits 8.

The synapse circuit 8 calculates the multiplication value ($w_i \cdot x_i$) of the signal value $x_i$ represented by the electrical signal and the weight value $w_i$. The weight value $w_i$ is set in advance for the synapse circuit 8. Charges corresponding to multiplication values ($w_i \cdot x_i^+$ and $w_i \cdot x_i^-$) of the weight value $w_i$ and the positive and negative signal values $x_i^+$ and $x_i^-$ input from the positive and negative input signal lines 6a and 6b are generated.

For example, in the case where a positive weight value $w_i^+$ is set, charges corresponding to $w_i^+ \cdot x_i^+$ are output to the positive output line 7a, and charges corresponding to $w_i^+ \cdot x_i^-$ are output to the output line 7a. Further, for example, in the case where a negative weight value $w_i^-$ is set, charges corresponding to $w_i^- \cdot x_i^+$ are output to the negative output line 7b, and charges corresponding to $w_i^- \cdot x_i^-$ are output to the positive output line 7b.

Note that in the synapse circuit 8, charges of the same sign (e.g., positive charges) are output regardless of the positive and negative of the weight value $w_i$ as charges corresponding to the multiplication value. Therefore, multiplication with $w_i^-$ can be regarded as multiplication with $|w_i^-|$ that is the absolute value thereof.

Further, in the case where the weight value $w_i=0$ is set, the multiplication values with the positive and negative signal values $x_i^+$ and $x_i^-$ are both zero. In this case, charges are not output from the synapse circuit 8 to the positive output line 7a and the negative output line 7b.

As described above, in the analog circuit 3, charges corresponding to the multiplication value obtained by multiplying the signal value $x_i$ by the weight value $w_i$ are generated by the plurality of synapse circuits 8 on the basis of the electrical signal input to each of the plurality of input signal lines 6. Further, the generated charges are output to the positive and negative output lines 7a and 7b in accordance with the sign of the weight value $w_i$. In this embodiment, the synapse circuit 8 corresponds to the multiplication unit.

The synapse circuit 8 is configured using, for example, a resistance element that generates a current from a voltage represented by and electrical signal, or a switch element or the like that switchably outputs the generated current to the respective output lines. For example, a circuit using a MOS (Metal Oxide Semiconductor) transistor or the like as a resistance element, a circuit using a flip-flop circuit or the like as a switch element, or the like may be configured. In addition, the specific configuration of the synapse circuit 8 is not limited.

Figure 4:
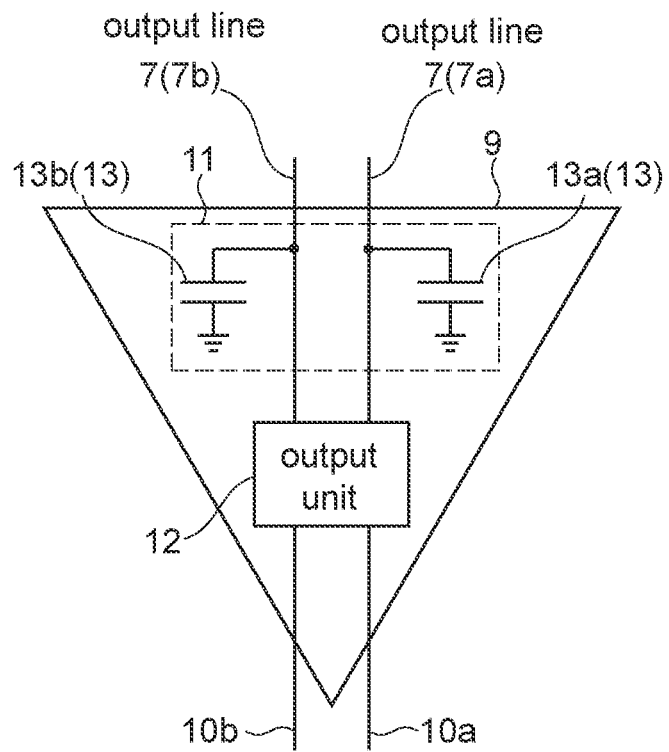
FIG. 4 is a schematic diagram showing a configuration example of a neuron circuit.

FIG. 4 is a schematic diagram showing a configuration example of the neuron circuit 9. The neuron circuit 9 includes an accumulation unit 11 and an output unit 12. FIG. 4 shows a two-input two-output neuron circuit 9 connected to the pair of output lines 7 and a pair of output signal lines 10.

The accumulation unit 11 accumulates the charges output to the pair of output lines 7 by the plurality of synapse circuits 8. The accumulation unit 11 includes two capacitors 13a and 13b. The capacitor 13a is connected between the positive output line 7a and a GND. Further, the capacitor 13b is connected between the negative output line 7b and a GND.

Therefore, charges flowing in from the output lines 7a and 7b are respectively accumulated in the capacitors 13a and 13b. Note that in the accumulation unit 11, a switch or the like for discharging the charges accumulated in each of the capacitors 13 is appropriately provided.

The output unit 12 outputs a multiply-accumulate signal representing the sum of the multiplication values $(w_i \cdot x_i)$ on the basis of charges accumulated in the accumulation unit 11. In this embodiment, as the multiply-accumulate signal, two signals, i.e., a positive multiply-accumulate signal and a negative multiply-accumulate signal respectively representing the positive and negative multiply-accumulate results, are generated.

When charges are accumulated in the capacitor 13, the potential of the side of the capacitor 13 connected to the output line 7 increases. By detecting this potential, it is possible to detect charges accumulated in the capacitor 13. For example, the output unit 12 detects the potential of the capacitor 13a to generate a positive multiply-accumulate signal, and detects the potential of the capacitor 13b to generate a negative multiply-accumulate signal. As described above, the neuron circuit 9 (the accumulation unit 11 and the output unit 12) outputs the multiply-accumulate signal representing the sum of multiplication values by accumulating charges corresponding to the multiplication value generated by each of the plurality of synapse circuits 8.

Further, the output unit outputs the multiply-accumulate signal (positive and negative multiply-accumulate signals) representing the sum of multiplication values within a predetermined output period. The predetermined output period is, for example, a period having a length similar to that of the input period T. The output period is a period following the input period, and is started at the end of the input period and ends when the period T has been elapsed, for example. In the following, the output period is referred to as the output period T having the same length as that of the input period T in some cases.

As described above, in this embodiment, an electrical signal of the TACT system is used. For example, when an electrical signal of the TACT system is input to the synapse circuit 8, charges are generated at a constant ratio continuously from the input timing of a pulse and output to the output line 7. As a result, charges are accumulated in the capacitor 13 at a constant ratio. For example, by detecting the timing when the potential of the capacitor 13 has exceeded a predetermined threshold value, it is possible to detect the total amount of charges output to the output line 7.

Thus, in the TACT system, charges are output at a rate (slope) corresponding to the respective weight values $w_i$, and the capacitor is charged until the charges exceed the threshold value. In this case, the entire multiply-accumulate result calculated by one analog circuit 3 can be calculated using the following formula as shown in Patent Literature 1, for example.

$$\sum_{i=1}^{N} W_i \cdot X_i = \frac{\theta^+ - \theta^- + \beta T_{in} - (\beta^+ t_t^+ - \beta^- t_V^-)}{T_{in}} \quad \text{[Math. 2]}$$

Here, $\theta^+$ and $\theta^-$ respectively represent threshold values for detecting the potentials of the capacitors 13a and 13b. Further, $\beta$ represents the total sum of the weight values $w_i$ set for the respective synapse circuits 8. $\beta^+$ and $\beta^-$ respectively represent the total sum of the positive weight values $w_i^+$ and the total sum of the negative weight values $|w_i^-|$, and $\beta=\beta^+-\beta^-$. Further, $T_{in}$ represents the input period T (the output period T).

$t_v^+$ and $t_v^-$ respectively represent timings when the potentials of the capacitors 13a and 13b have exceeded respective threshold values. In the output unit 12, an electrical signal of the TACT system whose pulse is started at the timing of $t_v^+$ is generated as the positive multiply-accumulate signal. Further, an electrical signal of the TACT system whose pulse is started at the timing of $t_v^-$ is generated as the negative multiply-accumulate signal.

In general, $\beta^+$, which is the total sum of the positive weight values $w_i^+$, and $\beta^-$, which is the total sum of the negative weight values $|w_i^-|$, have different values. However, as shown in FIG. 1 and FIG. 3, by providing the pair of positive and negative input signal lines 6a and 6b and multiplying the positive signal value $x_i^+$ and the negative signal value $x_i^-$ by the common weight value $w_i$, the relationship of $\beta^+=\beta^-=\beta_0$ can be established. In this case, the total sum $\beta$ of the entire weight value $w_i$ satisfies the relationship of $\beta=\beta^+-\beta^-=0$.

For example, the threshold values $\theta^+$ and $\theta^-$ for the capacitors 13a and 13b are set to the same value so that the scales of the multiply-accumulate results to be output are equal to each other. As a result, the (Math. 2) formula, which is a multiply-accumulate result calculated by the analog circuit 203, is modified as follows.

$$\sum_{i=1}^{N} W_i \cdot X_i = \frac{\beta_o(t_v^- - t_v^+)}{T_{in}} \qquad [\text{Math. 3}]$$

As shown in the (Math. 3) formula, the entire multiply-accumulate result can be calculated as a difference obtained by subtracting the timing $t_v^+$ when the potential of the capacitor 13b has exceeded the threshold value from the timing $t_v^-$ when the potential of the capacitor 13b has exceeded the threshold value. Such an operation can be easily executed using a logical circuit or the like on the basis of, for example, a positive multiply-accumulate signal representing the timing $t_v^+$ and a negative multiply-accumulate signal representing the timing $t_v^-$.

In this embodiment, the positive signal value $x_i^+$ and the negative signal value $x_i^-$, i.e., the positive multiply-accumulate signal and the negative multiply-accumulate signal, are input from the analog circuit 3 in the lower layer to the analog circuit 3 in the upper layer. Therefore, the entire multiply-accumulate result shown in the (Math. 3) formula is not calculated between the layers, and the positive and negative multiply-accumulate signals are transmitted as they are. As a result, for example, the entire multiply-accumulate result does not need to be calculated for each of the analog circuits 3, making it possible to simplify the circuit configuration.

Operation of Analog Circuit

As described above, in a time-axis analog multiply-accumulate operation, information of the signal value $x_i$ is replaced with the time-axis-reference parameter (the timing of the pulse in the TACT system) and transmitted. Meanwhile, for example, in a multiply-accumulator or the like of a digital system, a method of transmitting the signal value $x_i$ as it is as a numerical value is used. Hereinafter, the operation of the analog circuit 3 that performs a time-axis analog multiply-accumulate operation will be described as compared with a multiply-accumulator that transmits the signal value $x_i$ as a numerical value as it is and performs a multiply-accumulate operation independently of the time axis.

Figure 5:
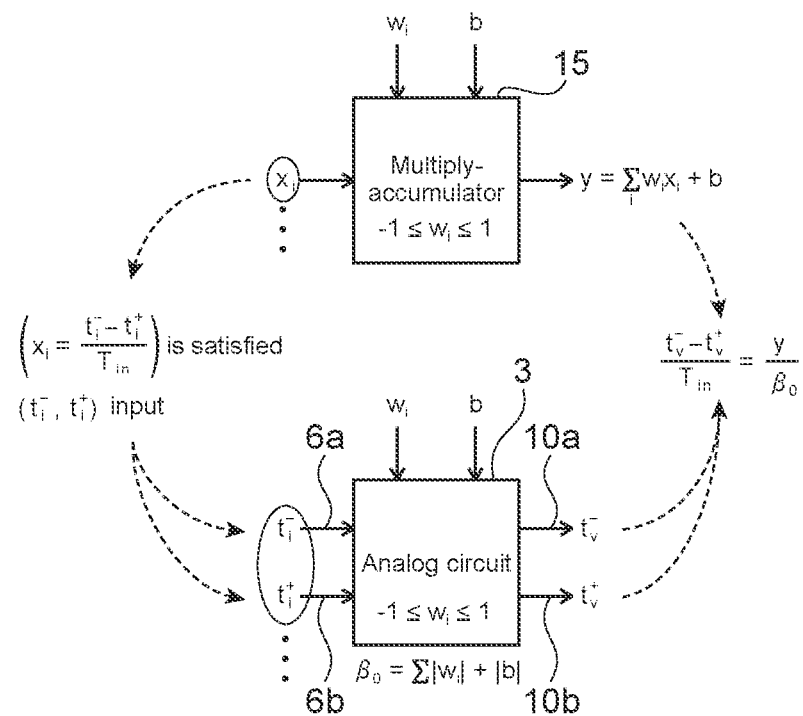
FIG. 5 is a schematic diagram for describing an operation of a multiply-accumulator and an analog circuit.

FIG. 5 is a schematic diagram for describing operations of the multiply-accumulator and the analog circuit 3. The upper diagram of FIG. 5 is a functional block diagram of a multiply-accumulator 15 and the lower diagram is a functional block diagram of the analog circuit 3. Hereinafter, assumption is made that the multiply-accumulator 15 is configured so as to be capable of executing processing similar to that of the analog circuit 3. Further, the signal value $x_i$ will be referred to as the input value $x_i$.

The multiply-accumulator 15 performs a multiply-accumulate operation on the basis of the input value $x_i$ transmitted as a numerical value, for example. The multiply-accumulator 15 is realized by, for example, a dedicated digital circuit, a general-purpose digital processor, or the like.

Further, the multiply-accumulator 15 can also be regarded as a functional block that performs a multiply-accumulate operation configured by a program. In FIG. 5, the i-th input value $x_i$ input to the multiply-accumulator 15 is schematically illustrated using arrows. Hereinafter, assumption is made that the number of the input values $x_i$ input to the multiply-accumulator 15 is N.

Further, the weight value $w_i$ to be multiplied by the input value $x_i$ is set for the multiply-accumulator 15. In FIG. 5, assumption is made that the weight value $w_i$ satisfying the relationship of $-1 \le w_i \le +1$ is set. Further, a predetermined bias term b is set for the multiply-accumulator 15. The bias term b is, for example, a parameter for biasing the outputs of the respective multiply-accumulators 15, and is appropriately set in accordance with, for example, processing to be implemented.

In a multiply-accumulate operation by the multiply-accumulator 15, an output value $y=\Sigma w_i \cdot x_i + b$ obtained by adding the biasing term b to the sum (see the (Math. 1) formula) of multiplication values of the input value $x_i$ and the weight value $w_i$ is output. Thus, in the multiply-accumulator 15, one output value y is calculated on the basis of N input values $x_i$. Note that the total sum represented by the symbol $\Sigma$ is the total sum for the subscript $i=(1, 2, \ldots, N)$.

As described above, N pairs of the input signal lines 6 are connected to the analog circuit 3, each of the pairs including the positive and negative input signal lines 6a and 6b. For example, the i-th input value $x_i$ is represented by each electrical signal (e.g., positive and negative multiply-accumulate signals) input to the i-th pair of input signal lines 6. Specifically, as described with reference to FIG. 4, electrical signals of a TACT system representing timing $t^+$ and timing $t^-$ are respectively input to the positive and negative input signal lines 6a and 6b. In FIG. 5, the timings $t_i^+$ and $t_i^-$ corresponding to the i-th input value $x_i$ are schematically illustrated using arrows.

In the TACT system, $t_i^+$ and $t_i^-$ represent values satisfying the relationship of $x_i=(t_i^- - t_i^+)/T_{in}$. Thus, this relationship allows $t_i^+$ and $t_i^-$ to be converted into $x_i$. N sets of such $(t_i^+, t_i^-)$ are input to the analog circuit 3. This corresponds to N input values $x_i$ being input.

N weight values $w_i$ multiplied by N $(t_i^+, t_i^-)$ are set for the analog circuit 3. Further, the bias term b is set for the analog circuit 3. The weight value $w_i$ and the bias term b set for the analog circuit 3 are similar to the weight value $w_i$ and the bias term set for the multiply-accumulator 15.

In the time-axis analog multiply-accumulate operation by the analog circuit 3, charges corresponding to the multiplication value of each $(t_i^+, t_i^-)$ and the weight value $w_i$ are appropriately accumulated, and a positive multiply-accumulate signal (electrical signal of the timing $t_v^+$) and a negative multiply-accumulate signal (electrical signal of the timing $t_v^-$) are output. Thus, in the analog circuit 3, a pair of outputs $(t_v^+, t_v^-)$ are calculated from N pairs of inputs $(t_i^+, t_i^-)$.

In the case where the bias term b is introduced, the relationship between the pair of outputs $(t_v^+, t_v^-)$ calculated by the analog circuit 3 and the output value y calculated by the multiply-accumulator 15 is expressed as follows.

$$y = \frac{t_v^- - t_v^+}{T_{in}} \beta_0 (\beta_0 = \Sigma |w_j| + |b|) \qquad [\text{Math. 4}]$$

For example, by using the (Math. 4) formula, it is possible to calculate the entire multiply-accumulate result by the analog circuit 3 from the output $(t_v^+, t_v^-)$ of the analog circuit 3. Note that in the analog circuit 3 provided in the lower layer, for example, the entire multiply-accumulate result or the like is not calculated, and the output $(t_v^+, t_v^-)$ is used as it is as an input to the analog circuit 3 in a subsequent stage.

In a configuration in which the output $(t_v^+, t_v^-)$ of the analog circuit 3 is input directly to the subsequent stage, as shown in the (Math. 4) formula, information relating to a multiply-accumulate result (output value y) is transmitted by the difference value $t_v^- - t_v^+$ of the output $(t_v^+, t_v^-)$. For example, focusing on the difference value $t_v^- - t_v^+$, the (Math. 4) formula is rewritten as follows.

$$\frac{t_v^- - t_v^+}{T_{in}} = \frac{y}{\beta_0} \quad \text{[Math. 5]}$$

As shown in the (Math. 5) formula, the difference value $t_v^- - t_v^+$, which is information represented by the output of the analog circuit 3, is multiplied by $1/\beta_0$ each time passing through the analog circuit 3. Therefore, for example, it can be said that the larger the total sum of the weight values $w_i$ set for each of the analog circuits 3, the smaller the difference value $(t_v^- - t_v^+)$. This will be specifically described below.

Figure 6:
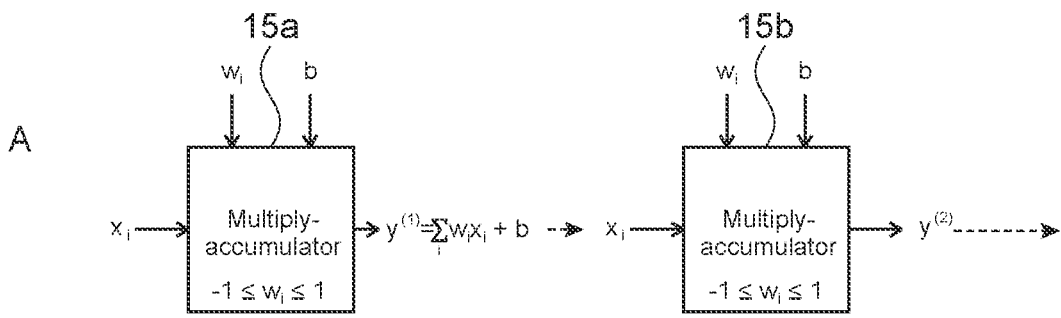
FIG. 6 is a schematic diagram for describing operations of multiply-accumulators connected in two stages and analog circuits connected in two stages.
Figure 6:
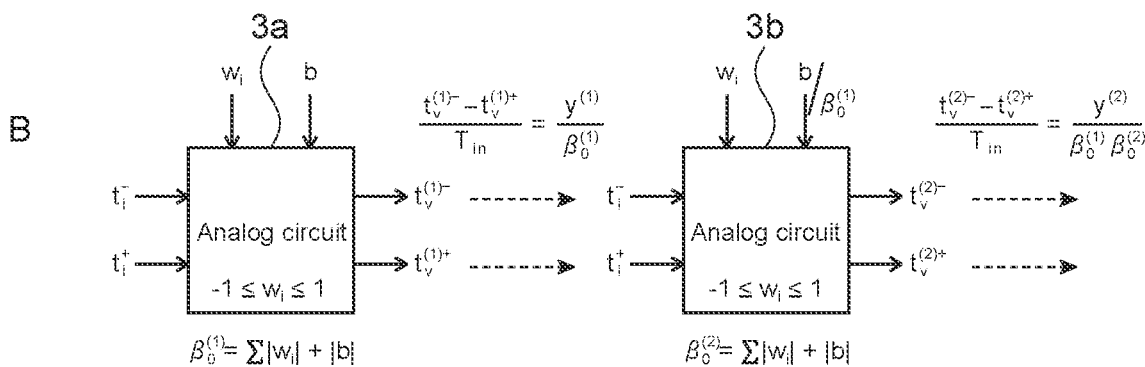

FIG. 6 is a schematic diagram for describing the operation of the multiply-accumulators 15 connected in two stages and the analog circuits 3 connected in two stages. In the following, the parameters relating to the first and second stages will be indicated using superscripts (1) and (2).

In Part A of FIG. 6, multiply-accumulators 15a and 15b connected in series are schematically illustrated. For example, an output value $y^{(1)}$ output from the multiply-accumulator 15a in the first stage is used as the input of the multiply-accumulator 15b in the second stage as it is. In this case, since the output value $y^{(1)}$ representing the entire multiply-accumulate result is the input of the next stage as it is, the value representing the present operation result is not reduced by passing through the multiply-accumulator 15.

In Part B of FIG. 6, analog circuits 3a and 3b connected in series are schematically illustrated. For example, a value $(t_v^{(1)-} - t_v^{(1)+})/T_{in}$ relating to the multiply-accumulate result represented by the output $(t_v^{(1)+}, t_v^{(1)-})$ of the analog circuit 3a in the first stage is obtained by multiplying the original multiply-accumulate result $(y^{(1)})$ by $1/\beta_0^{(1)}$. That is, the value representing the operation result becomes smaller at the time point when passing through the analog circuit 3a in the first stage.

The output $(t_v^{(1)+}, t_v^{(1)-})$ of the first stage is input to the analog circuit 3b in the second stage as it is. That is, it can be said that the value obtained by multiplying the original multiply-accumulate result by $1/\beta_0^{(1)}$ is input to the analog circuit 3b in the second stage. A time-axis analog operation is executed on the basis of the value multiplied by $1/\beta_0^{(1)}$. Therefore, a value $(t_v^{(2)-} - t_v^{(2)+})/T_{in}$ relating to the multiply-accumulate result represented by the output $(t_v^{(2)+}, t_v^{(2)-})$ of the analog circuit 3b in the second stage is the value obtained by multiplying the original multiply-accumulate result $(y^{(2)})$ by $1/(\beta_0^{(1)} \cdot \beta_0^{(2)})$. Note that in the analog circuit 3 in the second stage, $b/\beta_0^{(1)}$ is used as the bias value.

As described above, the value representing the present operation result becomes smaller by passing through the analog circuit 3. That is, each time passing through one analog circuit 3, the difference value $(t_v^- - t_v^+)$ is multiplied by $1/\beta_0$ and the value relating to the multiply-accumulate result is reduced in accordance with the total sum $\beta_0$ of weight values set for the analog circuit 3. For this reason, in the operation performed through the plurality of analog circuits 3, for example, there is a possibility that the final operation result is small.

Figure 7:
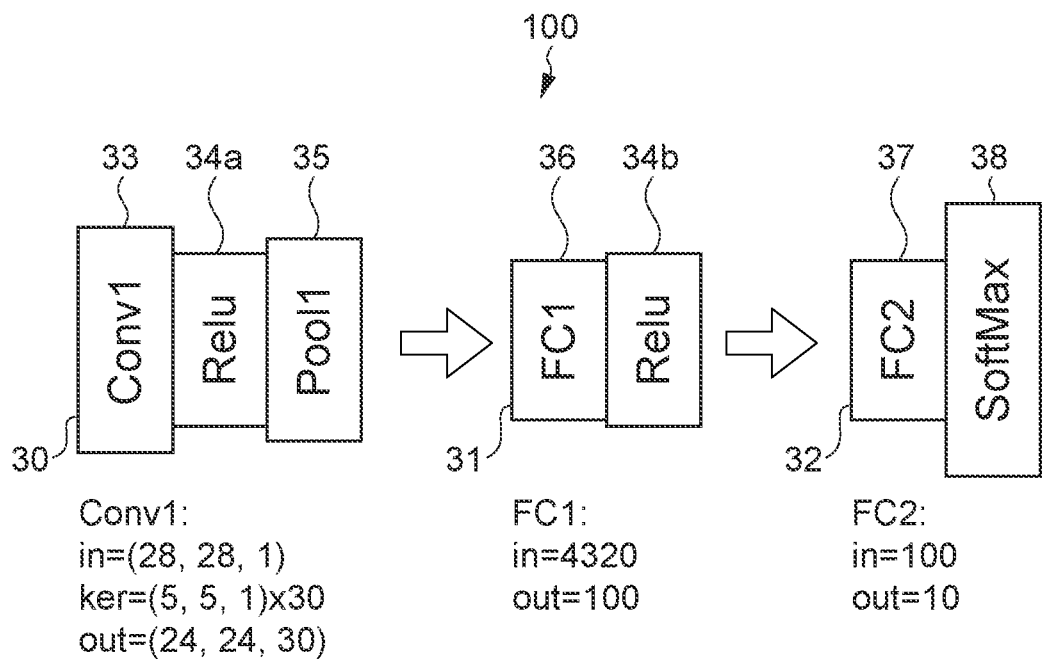
FIG. 7 is a schematic diagram showing an example of an arithmetic logic unit using the analog circuit.

FIG. 7 is a schematic diagram showing an example of the arithmetic logic unit 100 using the analog circuit 3. The arithmetic logic unit 100 has a three-layer structure of an input layer 30, an intermediate layer 31, and an output layer 32. In the example shown in FIG. 7, image data of 28×28 pixels is used as the input data. The arithmetic logic unit 100 implements, for example, a function of recognizing 10 numbers from 0 to 9.

The input layer 30 includes a convolution layer 33 (Conv1), a ReLU function unit 34a, and a pooling unit 35. The convolution layer 33 is a layer that executes convolution processing on image data in units of a target range (5×5). For example, a multiply-accumulate operation is performed on 28×28 image data by shifting the target range of 5×5 by one pixel. Hereinafter, the operation in the target range of 5×5 will be referred to as the unit operation.

In the example shown in FIG. 7, 30 types of unit operations are executed for one target range. For example, when the target range of 5×5 is shifted by one pixel with respect to 28×28 image data, the number of times of shifting the target range is 24×24. Therefore, 24×24×30 unit operations are executed for one piece of image data. In other words, since 30 types of unit operations are executed for 24×24 positions, the total number of unit operations is 24×24×30.

In the convolution layer 33, one unit operation is executed by one analog circuit 3. Therefore, 25 pairs of the input signal lines 6 are connected to one analog circuit 3. That is, the convolution layer 33 is provided with 24×24×30 analog circuits 3 for executing a multiply-accumulate operation on 5×5 data.

Note that the data for one pixel is input to the analog circuit 3 via, for example, the positive and negative input signal lines 6a and 6b. Therefore, 25 pairs of the input signal lines 6 are connected to the analog circuit 3. Further, a multiply-accumulate result is output from the analog circuit 3 via a pair of output signal lines 10a and 10b (see FIG. 3 and the like).

The ReLU function unit 34a is a circuit for applying a ReLU function to the outputs of the 24×24×30 analog circuits 3. For example, the multiply-accumulate result is output as it is in the case where the multiply-accumulate result of the analog circuit 3 is positive, and 0 is output in the case where the multiply-accumulate result of the analog circuit 3 is negative.

The pooling unit 35 is a circuit that reduces the 24×24×30 outputs. For example, the vertical and horizontal operation results are reduced by half from the result of 24×24 unit operations. As a result, 12×12×30=4,320 multiply-accumulate results are output from the input layer 30 to the intermediate layer 31 in the subsequent stage.

The intermediate layer 31 includes a first FC layer 36 (FC1: Full Connection 1) and a ReLU function unit 34b. The first FC layer 36 is provided with 100 analog circuits 3. To each of the analog circuits 3, 4,320 multiply-accumulate results output from the input layer 30 are input. The ReLU function unit 34b applies the ReLU function to the 100 multiply-accumulate results output from the first FC layer 36.

The output layer 32 includes a second FC layer 37 (FC2) and a SoftMax unit 38. The second FC layer 37 is provided with 10 analog circuits 3. To each of the analog circuits 3, 100 multiply-accumulate results output from the intermediate layer 31 are input. The SoftMax unit 38 converts 10 multiply-accumulate results output from the second FC layer 37 into values for output (probabilistic values, etc.) using a predetermined conversion function (SoftMax function, etc.). The 10 results output from the SoftMax unit 38 are the output results (e.g., the result of recognizing 10 numbers) of the arithmetic logic unit 100.

Figure 8:
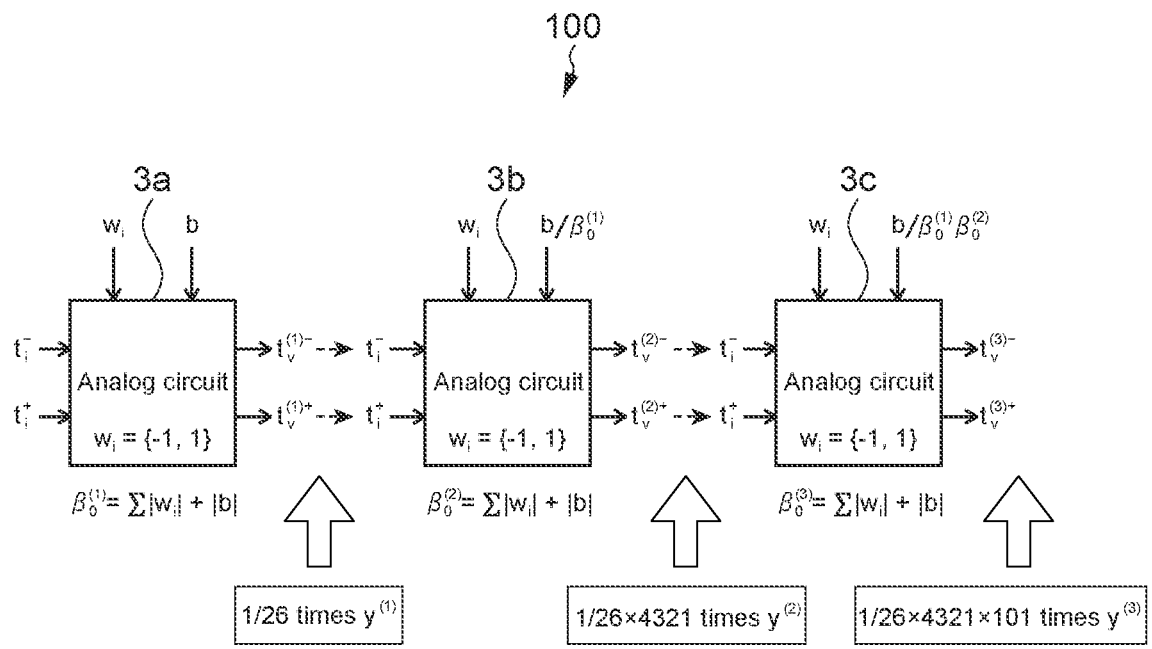
FIG. 8 is a schematic diagram for describing an example of an operation of the arithmetic logic unit shown in FIG. 7.

FIG. 8 is a schematic diagram for describing an example of an operation of the arithmetic logic unit shown in FIG. 7. In FIG. 8, analog circuits 3a, 3b, and 3c respectively included in the input layer 30 (the convolution layer 33), the intermediate layer 31 (the first FC layer 36), the output layer 32 (the second FC layer 37) are illustrated. The analog circuits 3a to 3c are respectively 25-input, 4,320-input, and 100-input circuits. Note that the one-input corresponds to the connection of the pair of input signal lines 6a and 6b.

In FIG. 8, a binary connection is used to binarize the weight value $w_i$ and set the binarized weight value. The binary connection is a method used in image recognition by, for example, a neural network. By binarizing the weight value $w_i$, it is possible to simplify the configuration of the synapse circuit 8 for which the weight value $w_i$ is set. In the example shown in FIG. 8, the normalized weight value $w_i = \pm 1$ is used.

In this case, the total sum $\Sigma |w_i|$ of the weight value $w_i$ is equal to the total number of the weight value $w_i$ to be set, i.e., the number of inputs. Thus, $\beta_0$ in the analog circuit 3 is the number obtained by adding the bias term b to the number of inputs. Regarding each bias term b as 1, for example, $\beta_0^{(1)} = 25+1 = 26$ in the analog circuit 3a included in the convolution layer 33. Further, $\beta_0^{(2)} = 4,320+1 = 4,321$ in the analog circuit 3b included in the first FC layer 36. Further, $\beta_0^{(3)} = 100+1 = 101$ in the analog circuit 3c included in the second FC layer 37.

For example, in the input layer 30, the analog circuit 3a outputs $(t_v^{(1)+}, t_v^{(1)-})$. The difference value $(t_v^{(1)-} - t_v^{(1)+})/T_{in}$ of this output is the value obtained by multiplying the original multiply-accumulate result $(y^{(1)})$ by 1/26. The output of the analog circuit 3a is input to the analog circuit 3b of the intermediate layer 31 as it is via the ReLU function unit 34a and the pooling unit 35.

In the intermediate layer 31, the analog circuit 3b outputs $(t_v^{(2)+}, t_v^{(2)-})$ on the basis of the operation result obtained by being multiplied by 1/26. The difference value $(t_v^{(2)-} - t_v^{(2)+})/T_{in}$ of this output is the value obtained by multiplying the original multiply-accumulate result $(y^{(2)})$ by $1/(26 \times 4,321)$. The output of the analog circuit 3b is input to the analog circuit 3d of the output layer 32 via the ReLU function unit 34b.

In the output layer 32, the analog circuit 3d outputs $(t_v^{(3)+}, t_v^{(3)-})$ on the basis of the operation result obtained by being multiplied by $1/(26 \times 4,321)$. The difference value $(t_v^{(3)-} - t_v^{(3)+})/T_{in}$ of this output is the value obtained by multiplying the original multiply-accumulate result $(y^{(3)})$ by $1/(26 \times 4,321 \times 101)$. The output of the analog circuit 3c is input to the SoftMax unit 38, and the operation result of the arithmetic logic unit 100 is output.

Figure 9:
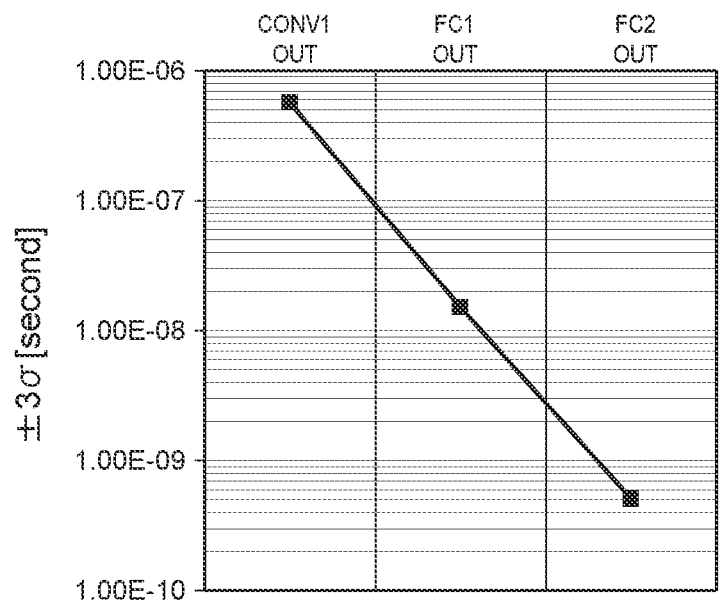
FIG. 9 is a graph showing the change in the difference value of the timing output from the analog circuit.

FIG. 9 is a diagram showing changes in the difference value of the timing output from the analog circuit 3. The graph shown in FIG. 9 shows the width of the distribution of the difference value $(t_v^{(n)-} - t_v^{(n)+})$ output from the analog circuit 3 included in each layer. The width of the distribution is represented by the value of $\pm 3\sigma$ in the distribution of the difference value $(t_v^{(n)-} - t_v^{(n)+})$, and the unit thereof is second. Here, $\sigma$ is the standard deviation of the distribution. Note that in FIG. 9, the input period $T_{in}$ is set to 1 µsec.

The arithmetic logic unit 100 is capable of comparing the magnitude of the multiply-accumulate result, or the like by detecting, for example, the difference value $(t_v^{(n)-} - t_v^{(n)+})$ output from each of the analog circuits 3. Therefore, it can be said that the smaller the width of the distribution of the difference value, the more difficult it is to compare the individual multiply-accumulate result, for example.

As shown in FIG. 9, the width of the distribution of the difference value $(t_v^{(1)-} - t_v^{(1)+})$ output from the convolution layer 33 is approximately 0.5 µsec. Further, the width of the distribution of the difference value $(t_v^{(2)-} - t_v^{(2)+})$ output from the first FC layer 36 is reduced to approximately 10 nsec. Further, the width of the distribution of the difference value $(t_v^{(3)-} - t_v^{(3)+})$ output from the second FC layer 37 is reduced to approximately 0.5 nsec. As described above, in the time-axis analog multiply-accumulate operation using the analog circuit 3, the parameter (difference value) representing the operation result decreases each time passing through each of the layers, in some cases.

Figure 10:
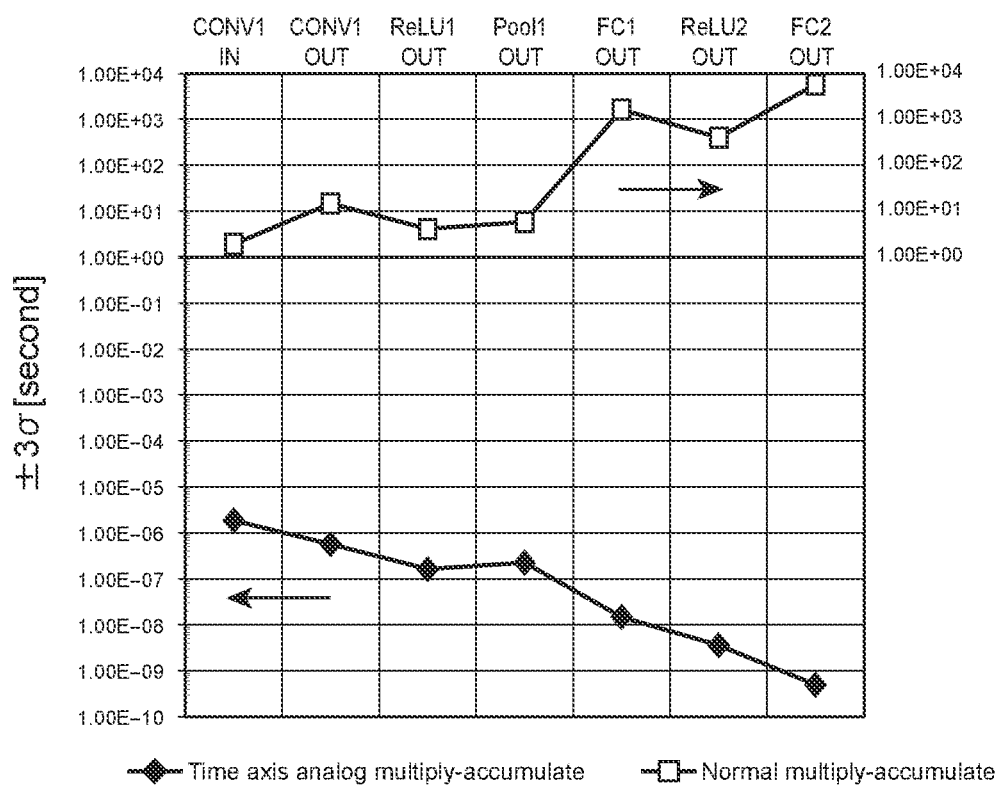
FIG. 10 is a graph showing the change in the respective outputs of the multiply-accumulator and the analog circuit.

FIG. 10 is a graph representing the changes in the output of each of the multiply-accumulator 15 and the analog circuit 3. In FIG. 10, the distribution widths ($\pm 3\sigma$) of the outputs (difference values) of the respective units in the arithmetic logic unit 100 including the analog circuit 3 are indicated by the black data points. The graph of the black data points is a graph in which the graph shown in FIG. 9 is detailed. Note that the leftmost data point indicates the distribution width of the inputs to the arithmetic logic unit 100.

Further, in FIG. 10, the distribution widths ($\pm 3\sigma$) of the output values y of the respective units in the case where the arithmetic logic unit 100 shown in FIG. 7 is configured by using the multiply-accumulator 15 are indicated by outline data points. Note that the output value y is a dimensionless quantity. Further, the leftmost data point indicates the distribution width of the input value.

In the example shown in FIG. 10, the distribution width of the output value y (output value $y^{(3)}$ of FC2) of the multiply-accumulator 15 in the last stage increases as compared with the distribution width of the first input value. In this manner, in the case where the output value y, which is a multiply-accumulate result, is directly calculated and the value is input to the multiply-accumulator 15 in the next stage, the distribution width of the output value y increases in some cases. Note that the final output value y is reduced depending on the configuration of the multiply-accumulator 15.

Meanwhile, in the case where the analog circuits 3 are connected in series and a time-axis analog multiply-accumulate operation is performed, an operation result is reduced by the action of $1/\beta_0$ when an electrical signal passes through the analog circuit 3. As a result, it is difficult to detect the final operation result in some cases.

Setting of Weight Value

In the present disclosure, the value of the weight value $w_i$ set for each of the analog circuits 3 (the synapse circuit 8) is limited to fall within a predetermined value range. Here, the predetermined value range is, for example, a range of possible values of the weight value $w_i$ set in advance. That is, it can be said that the weight value $w_i$ whose value is limited in advance is set for each of the analog circuits 3. By performing a time-axis analog multiply-accumulate operation using the weight value $w_i$ with the limited value range, a multiply-accumulate operation method according to this embodiment is executed.

Further, the predetermined value range includes a plurality of limit values. That is, the possible values of the weight value $w_i$ are limited by discrete limit values. Therefore, the weight value $w_i$ is set to one of the plurality of limit values. By limiting the weight value $w_i$ discretely in this way, it is possible to reduce, for example, the above-mentioned $\beta_0$ or the like.

Figure 11:
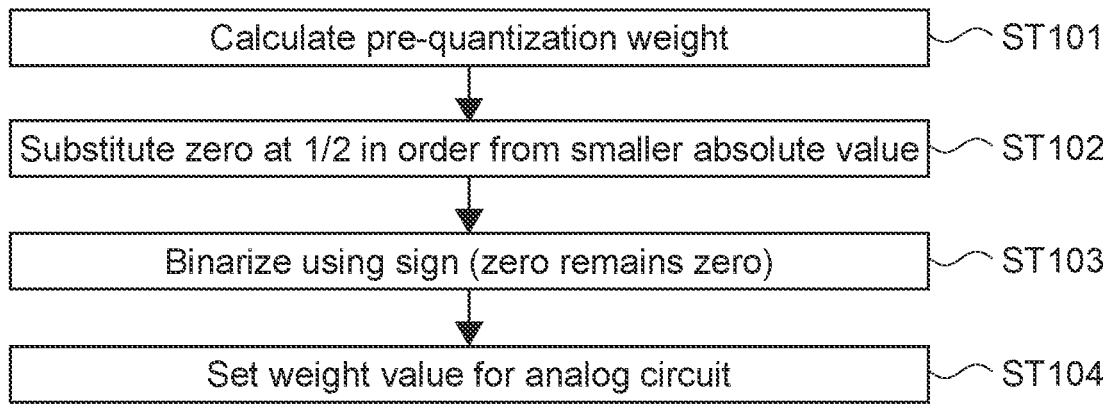
FIG. 11 is a flowchart showing an example of limitation processing of a weight value.

FIG. 11 is a flowchart showing an example of limitation processing of the weight value $w_i$. The weight value $w_i$ is calculated in advance using an arithmetic logic unit such as a computer. At this time, the value of the weight value $w_i$ is limited to fall within a predetermined value range.

First, a pre-quantization weight $v_i$ is calculated using a computer or the like (Step101). For example, a computer model such as a neural network implemented in the arithmetic logic unit 100 is constructed. In the computer model, nodes corresponding to the analog circuits 3 included in the arithmetic logic unit 100 are provided. Further, a weight corresponding to the weight value $w_i$ of the synapse circuit 8 is set for each node.

By appropriately learning the computer model, a weight (strength of synaptic connection) corresponding to the target processing is calculated. That is, the same number of weights as the number of the weight values $w_i$ used in the arithmetic logic unit 100 are calculated. Note that the computer model is configured such that, for example, each weight is calculated as a value using a floating point representation. The weight (i.e., a weight that is not quantized by positive values) represented by this floating point representation is used as the pre-quantization weight $v_i$.

The pre-quantization weight $v_i$ is represented by an arbitrary real number including positive and negative ones, for example. Further, for example, the pre-quantization weight $v_i$ may be calculated within a predetermined range such as $-\alpha \leq v_i \leq +\alpha$. Alternatively, the pre-quantization weight v may be calculated in a normalized range such as $-1 \leq v_i \leq +1$. In addition, the method of calculating the pre-quantization weight $v_i$ is not limited. In this embodiment, the pre-quantization weight $v_i$ corresponds to the value to be the weight value.

The weight limitation processing of setting the weight value $w_i$ on the basis of the absolute value of the pre-quantization weight $v_i$ is executed (Step102). In this embodiment, the absolute value of the pre-quantization weight $v_i$ corresponds to the first value that is the absolute value of the value to be the weight value. Further, the weight limitation processing corresponds to the first processing.

In FIG. 11, as the weight limitation processing, processing of substituting zero at a first ratio from the smallest absolute value of the pre-quantization weight $v_i$ is executed. The weight value $w_i$ corresponding to the pre-quantization weight $v_i$ substituted with zero is set to zero (limit value) as described below. By limiting the value of the pre-quantization weight $v_i$ in this way, the weight value $w_i$ can be limited.

The weight limitation processing is executed on N pre-quantization weights $v_i$ (weight values $w_i$) set for one analog circuit 3. That is, the processing of setting the weight value $w_i$ to zero at the first ratio in order from the smallest absolute value of the pre-quantization weight $v_i$ is executed, the weight value $w_i$ being set for each of the plurality of synapse circuits 8 included in the analog circuit 3. Note that the first ratio is appropriately set in accordance with the processing accuracy or the like necessary for the arithmetic logic unit 100.

In the weight limitation processing, for example, the absolute values of N pre-quantization weights $v_i$ are calculated, and the pre-quantization weights $v_i$ whose number corresponds to the first ratio are substituted with zero in order from the smallest absolute value. For example, in the case where the first ratio is set to ½, the N/2 pre-quantization weights $v_i$ are set to zero from the smallest absolute value. In this case, the N/2 pre-quantization weights $v_i$ having large absolute values are maintained at the values at the time of calculation. Further, for example, in the case where the first ratio is set to ¾, the N×¾ pre-quantization weights $v_i$ are set to zero from the smallest absolute value. In this case, the N/4 pre-quantization weights $v_i$ having large absolute values are maintained at the values at the time of calculation.

The processing of binarizing the pre-quantization weight $v_i$ is executed, and the weight value $w_i$ is calculated (Step103). The binarization processing is processing of calculating two values on the basis of, for example, the value of the pre-quantization weight $v_i$. In this embodiment, the positive limit value and negative limit value having equal absolute values are calculated by the binarization processing. These positive and negative limit values are set as the weight value $w_i$.

In this embodiment, for example, binarization processing of setting one of −1 (negative limit value) and +1 (positive limit value) as the corresponding weight value $w_i$ is executed in accordance with the sign of the pre-quantization weight $v_i$. Note that zero is calculated as the corresponding weight value $w_i$ for the pre-quantization weight $v_i$ whose value is zero.

For example, in the case where the pre-quantization weight $v_i$ is negative ($v_i<0$), −1 is set as the corresponding weight value $w_i$. Further, in the case where the pre-quantization weight $v_i$ is positive ($v_i>0$), +1 is set as the corresponding weight value $w_i$. Each of the calculated weight values $w_i$ is recorded as weight value data.

The weight value $w_i$ is set for the analog circuit 3 (each of the synapse circuits 8) on the basis of the weight value data (Step104). For example, using a wire or the like for setting the weight value $w_i$ provided in the analog circuit 3, the weight value $w_i$ stored in the weight value data is set for each of the synapse circuits 8. Further, for example, the analog circuit 3 or the like designed on the basis of the calculated weight value $w_i$ may be used. In addition, the method of setting the weight value $w_i$ for the analog circuit 3, and the like are not limited.

Thus, in the processing shown in FIG. 11, three types of values of −1, 0, and +1 are set as the weight value $w_i$. For example, in the case where the first ratio was set to 50% (½), then at least half of the weight values $w_i$ are set to zero. This makes it possible to thin the weight value $w_i$ with less impact and make the weight value $w_i$ sparse. In the present disclosure, a time-axis analog multiply-accumulate operation is executed using this weight value $w_i$ that has been made sparse.

Figure 12:
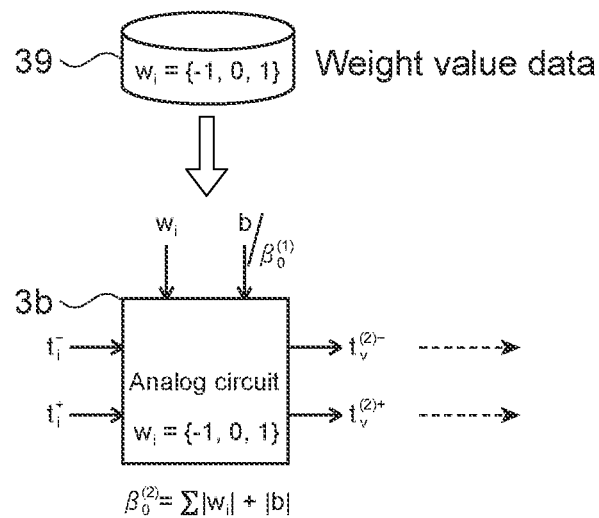
FIG. 12 is a schematic diagram for describing an example of an operation of the analog circuit for which a weight value that is made sparse has been set.

FIG. 12 is a schematic diagram showing an example of an operation of the analog circuit 3 for which the weight value $w_i$ that has been made sparse is set. In FIG. 12, the analog circuit 3b included in the first FC layer 36 (the intermediate layer 31) shown in FIG. 8 is illustrated.

Hereinafter, the operation of the analog circuit 3b using the weight value $w_i$ that has been made sparse will be described. Further, in the example shown in FIG. 12, assumption is made that the weight value $w_i$ set for the analog circuit 3a in the previous stage is not made sparse. Note that the content described below is also applicable to the case where the weight value $w_i$ that has been made sparse is set for the analog circuits 3a and 3c or the like included in another layer.

As described above, the analog circuit 3b included in the first FC layer 36 is a 4,320-input circuit. That is, 4,320 weight values $w_i$ are set for the analog circuit 3. Therefore, in the processing shown in FIG. 11, 4,320 weight values $w_i$ are calculated as a weight value data 39 for setting the analog circuit 3b.

For example, in the case where the ratio of setting the weight value $w_i$ to zero, i.e., the first ratio is ½(50%), the 4,320/2=2,160 weight values $w_i$ are set to zero. Further, 2,160 weight values $w_i$ are set to ±1. Therefore, $\beta_0^{(2)}$ in the analog circuit 3b satisfies the relationship of $\beta_0^{(2)}$=4,320/2+1=2,161. Therefore, the difference value $(t_v^{(2)-}-t_v^{(2)+})/T_{in}$ of the output $(t_v^{(2)+}, t_v^{(2)-})$ of the analog circuit 3b is a value obtained by multiplying the original multiply-accumulate result ($y^{(2)}$) by 1/(26×2,161).

Further, in the case where the first ratio is ¾ (75%), 4,320×¾=3,240 weight values $w_i$ are set to zero. Further, 1,080 weight values $w_i$ are set to ±1. Therefore, $\beta_0^{(2)}$ in the analog circuit 3b satisfies the relationship of $\beta_0^{(2)}$=4,320/4+1=1,081. Therefore, the difference value $(t_v^{(2)-}-t_v^{(2)+})/T_{in}$ of the output $(t_v^{(2)+}, t_v^{(2)-})$ of the analog circuit 3b is a value obtained by multiplying the original multiply-accumulate result ($y^{(2)}$) by 1/(26×1,081).

Thus, by performing sparse processing of setting the weight value $w_i$ to zero at the first ratio (50% or 75%), the value of $\beta_0^{(2)}$ is reduced. As a result, the value representing the multiply-accumulate result output from the analog circuit 3b, i.e., the difference value $(t_v^{(1)-}-t_v^{(1)+})/T_{in}$ of the output can be increased as compared with the case without performing sparse processing. By making the weight sparse, the individual output difference value increases, which expands the distribution of the difference values. This alleviates the problem of being difficult to compare the multiply-accumulate result described with reference to FIG. 9.

FIG. 13 is a graph showing the changes in the difference value of the timing output from the analog circuit 3. FIG. 13 shows the changes in the difference value in each layer in the case where the weight value $w_i$ that has been made sparse is set for the analog circuit 3b. Note that the weight values $w_i$ (±1) that have not been made sparse are set for the analog circuits 3a and 3c in the preceding and subsequent stages of the analog circuit 3b.

The white data points represent a graph in the case where the first ratio is set to 50%, and the gray data points represent a graph in the case where the first ratio is set to 75%. Further, in FIG. 13, the graph described with reference to FIG. 9, i.e., the graph in the case where the weight values that have not been made sparse are used in all the analog circuits 3a to 3c, is indicated by black data points.

For example, the distribution widths ±3σ of the difference value of the convolution layer 33 (Conv1) disposed in the first stage are substantially the same values between the three graphs. The distribution width of the difference value of the first FC layer 36 (FC1) disposed in the second stage increases as the first ratio increases. That is, the more the weight value $w_i$ of zero is set, the value of the second stage increases. Further, the distribution width of the difference value of the second FC layer 37 (FC2) disposed in the third stage increases as the first ratio increases, similarly to the result of the second stage.

Thus, by making the weight value $w_i$ of the intermediate analog circuit 3b sparse, it is possible to increase the operation result output from the analog circuit 3c in the subsequent stage. As a result, for example, it is possible to detect the final operation result with high accuracy, and appropriately execute, for example, the recognition processing by the arithmetic logic unit 100.

FIG. 14 is a graph showing the change rates of standard deviations σ of the difference values. FIG. 15 is a table showing the change rates of the standard deviations σ of a multiply-accumulate result and the difference values. In FIG. 14, the change rate of the standard deviation σ of the difference value in the case where four types of sparse processing (weight limitation processing) are performed is shown using a bar graph. Note that the change rate of the standard deviation σ is the change rate based on the standard deviation $\sigma_0$ of the difference value in the case where no sparse processing is performed. For example, in the case where the change rate is 1, it is similar the standard deviation $\sigma_0$ and there is no change.

In FIG. 14, as sparse processing, the change rates of a pattern A in which 50% of the weight values $w_i$ are randomly set to zero, and a pattern B in which 75% of the weight values $w_i$ are randomly set to zero are shown. Further, the change rates of a pattern C in which 50% of the pre-quantization weights $v_i$, which have smaller absolute values, are set to zero, and a pattern D in which 75% of the pre-quantization weights $v_i$, which have smaller absolute values, are set to zero are shown.

In the case where the weight value $w_i$ is randomly set to zero (patterns A and B), the standard deviation σ of the difference value $(t_v^- - t_v^+)$ is substantially unchanged. Thus, in the method of randomly thinning the weight value $w_i$, the distribution of the difference value is not expanded enough, and the operation result is not so much expected to increase.

Further, the standard deviation σ of the difference value is 1.67 times in the case where 50% from the smallest absolute value are set to zero (pattern C), and the standard deviation σ of the difference value is 2.41 times in the case where 75% are set to zero (pattern D). Thus, by limiting the weight value $w_i$ with reference to the absolute value of the pre-quantization weight $v_i$, the distribution of the difference value can be sufficiently enlarged, and the operation result can be effectively increased.

FIG. 15 shows the change rates of the standard deviations of the multiply-accumulate result y, the difference value, and the normalized difference value in the patterns C and D. The multiply-accumulate result y is the original multiply-accumulate result y calculated on the basis of the (Math. 4) formula, for example. For example, by making the weight value $w_i$ sparse, the case where the value of the multiplication value $(w_i \cdot x_i)$ of the input value $x_i$ and the weight value $w_i$ is zero increases. Therefore, the multiply-accumulate result y representing the sum of multiplication values decreases by making the weight value $w_i$ sparse.

The change rate of the standard deviation of the difference value in each of the patterns is normalized using the change rate of the standard deviation of the multiply-accumulate result y. The normalized change rate of the standard deviation of the difference value was 2.06 (to 2) in the pattern C and 3.95 (to 4) in the pattern D. Thus, the normalized change rate matches the ratio of the weight value $w_i$ that has been made sparse (the first ratio).

In the following, another method of making the weight value $w_i$ sparse, i.e., limiting the value range of the weight value $w_i$ values, will be described.

As described in Step102 of FIG. 11, in the weight limitation processing described above, a method of converting the weight value $w_i$ into zero at the predetermined ratio (first ratio) from the smallest absolute value of the pre-quantization weight $v_i$ was used. It can be said that this method is a method of setting the weight values $w_i$ having relatively small pre-binarization values, of N weight values $w_i$, to zero. For example, the weight value $w_i$ can be limited by directly evaluating the absolute value of the pre-binarization value.

For example, as the weight limitation processing, the processing of setting the weight value $w_i$ to zero is executed when the absolute value of the pre-quantization weight $v_i$ is a first threshold value d or less. As a result, it is possible to directly evaluate the magnitude of the pre-quantization weight $v_i$.

The first threshold value d is set with reference to, for example, the average value ave=$(\Sigma|v_i|)/N$ of the absolute values of the pre-quantization weights $v_i$. Here, N represents the number of the pre-quantization weights $v_i$ and $\Sigma$ represents the total sum of the absolute values of the N pre-quantization weights $v_i$. For example, in the case where 70% of the average value ave of the absolute values is set as the first threshold value d, the first threshold value d is expressed as d=$0.7\times(\Sigma|v_i|)/N$. It goes without saying that the first threshold value d may be calculated using another ratio, such as 80% and 40% of ave.

In the weight setting processing, threshold determination is performed on the basis of the first threshold value d, and zero is calculated as the weight value $w_i$ corresponding to the pre-quantization weight $v_i$ having an absolute value smaller than the first threshold value d. Further, ±1 are calculated in accordance with the sign of the pre-quantization weight $v_i$ as the weight value $w_i$ corresponding to the pre-quantization weight $v_i$ having an absolute value larger than the first threshold value d. That is, the weight value $w_i$ is calculated using the following formula.

$$\begin{cases} w_i = 1, \text{ if } v_i > d \\ w_i = 0, \text{ if } |v_i| \leq d \\ w_i = -1, \text{ if } v_i < -d \end{cases} \quad [\text{Math. 6}]$$

This makes it possible to set the weight value $w_i$ having a sufficiently small pre-quantization weight $v_i$ to zero, and thin the weight value $w_i$ with less impact on the operation. The calculated weight value $w_i$ is recorded as the weight value data 39 and set for the analog circuit 3 (individual synapse circuit).

Figure 16:
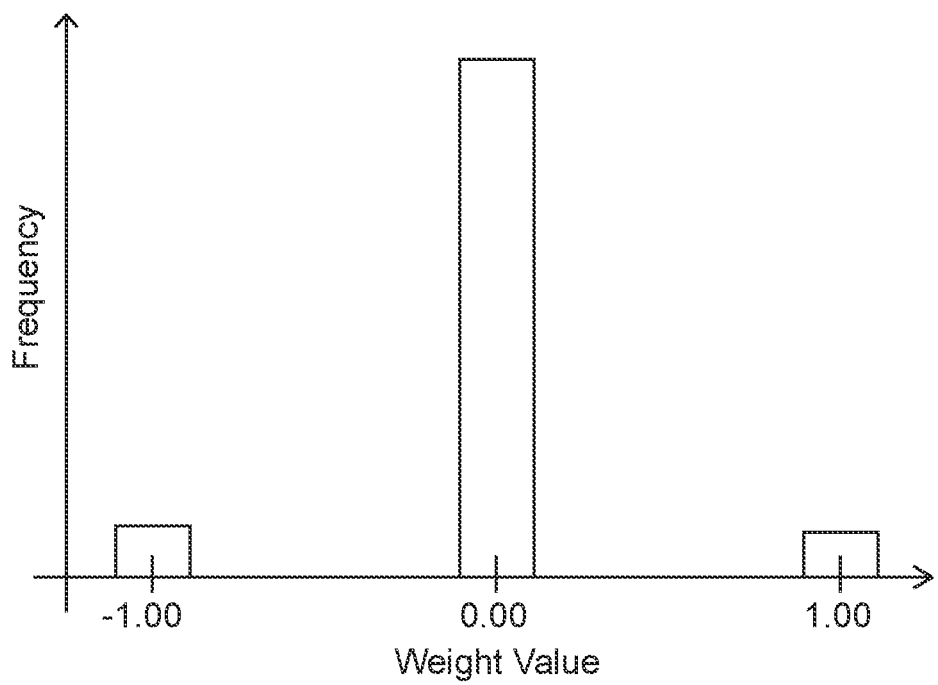
FIG. 16 is a graph showing the distribution of the weight value that has been made sparse using a first threshold value.

FIG. 16 is a graph representing the distribution of the weight value $w_i$ that has been made sparse using the first threshold value d. The horizontal axis of the graph indicates the weight value $w_i$, and the vertical axis indicates the frequency (Frequency) obtained by dividing the set number of the weight valued $w_i$ by the total number of weights. FIG. 16 shows the distribution of the weight value $w_i$ set for the analog circuits 3 included in one layer in the case where 70% of the average value ave of the absolute values is used as the first threshold value d.

In the case where the first threshold value d is set to 70% of ave, approximately 70% of the weight values $w_i$ are set to 0. Further, the remaining 30% of the weight values $w_i$ are set to ±1. Thus, by the sparse processing of setting 70% of the weight values $w_i$ to zero, approximately 70% of components of the sum of the multiplication values $w_i \cdot x_i$ of the input values $x_i$ and the weight values $w_i$ are reduced. As a result, a multiply-accumulate result corresponding to substantially 30 inputs is output from, for example, a 100-input analog circuit 3.

Figure 17:
FIG. 17 is a schematic diagram for describing a multiply-accumulate result represented by an electrical signal.
Figure 17:

FIG. 17 is a schematic diagram for describing a multiply-accumulate result represented by an electrical signal. As described with reference to FIG. 2, an electrical signal (pulse signal) of a TACT system is a signal representing a numerical value within a set input period T. In FIG. 17, the input periods T are schematically illustrated using arrows.

In the case where the input value $x_i$ is a value ($2^K$) with predetermined bit precision K, assumption is made that $2^L$ weight values $w_i$, which are not zero, are set for the analog circuit 3, and the absolute value is set to 1, for example. In this case, there is a possibility that the output value y of the size of $2^K \times 2^L$ is output from the analog circuit 3 that performs a time-axis analog multiply-accumulate operation. That is, in order to accurately express the output value y, precision equivalent to K+L bits is necessary.

Meanwhile, assumption is made that the temporal resolution that can be expressed by the pulse timing (or pulse width) in the input period T is K bits. In this case, in order to obtain the temporal resolution corresponding to K+L bits in an output period T', the necessary length of the output period T' is $2^L$ times the input period T. For example, in the case where there are approximately 100 weight values $w_i$, which are not zero, L≈7, the output period T' satisfies the relationship of T'=T×$2^L$≈100 T, and there is a possibility that the output period T' is significantly longer.

In another aspect, in the case where the output period T' having the same length as the input period T is set (T=T'), the temporal resolution for accurately representing the output value y output from the analog circuit 3 needs to be 1/100 of the temporal resolution of the input period T, and there is a possibility that the detection accuracy is lowered.

For example, assumption is made that an electrical signal represented by the input value $x_i$ with an information amount of 8 bits ($2^8$) is input to the 100-input analog circuit 3. At this time, in the case where the weight values $w_i$ of the analog circuit 3 are all −1 or +1, the multiply-accumulate result (output value y) by the analog circuit 3 is approximately 15 bits. In this case, as shown in the upper side of FIG. 17, the electrical signal representing the multiply-accumulate result is a signal representing information of $2^{15}$=32,768 by the period T.

Meanwhile, for example, in the case where sparse processing of limiting 70% of the weight values $w_i$ to 0 is performed as shown in FIG. 16, the input of the analog circuit 3 can be substantially regarded as 30-input (to $2^5$). For this reason, the multiply-accumulate result (output value y) by the analog circuit 3 is approximately 13 bits. In this case, as shown in the lower side of FIG. 17, the electrical signal representing the multiply-accumulate result is a signal representing information of $2^{13}$=8,192 by the period T.

As described above, by making 70% of the weight values $w_i$ sparse, the length of time that can be used for, for example, expressing the unit output (output with a value of 1) is approximately four times. That is, the output ratio due to the sparse processing is increased to approximately four times. As a result, it is possible to detect a multiply-accumulate result with sufficiently high accuracy. As a result, it is possible to appropriately execute various types of processing using a time-axis analog multiply-accumulate operation.

As described above, in the arithmetic logic unit 100 according to this embodiment, an electrical signal corresponding to the input value $x_i$ is input from the plurality of input signal lines 6, and charges corresponding to the multiplication value of the input value $x_i$ and the weight value $w_i$ are generated on the basis of the electrical signal. The generated charges are accumulated and a multiply-accumulate signal representing the sum of multiplication values is output. At this time, the value of the weight value $w_i$ is limited. By limiting the weight value $w_i$, for example, it is possible to adjust the sum of multiplication values. As a result, it is possible to detect an operation result with high accuracy in the circuit of the analog system performing a multiply-accumulate operation.

Second Embodiment

An arithmetic logic unit 200 according to the present technology will be described. In the following description, description of the configurations and effects similar to those in the arithmetic logic unit 100 described in the above-mentioned embodiment will be omitted or simplified.

In this embodiment, possible values of the signal value (input value) of the electrical signal input to each of the signal lines 1 are limited when a time-axis analog multiply-accumulate operation is performed. Thus, the value of the signal value is limited to fall within a predetermined value range.

Figure 18:
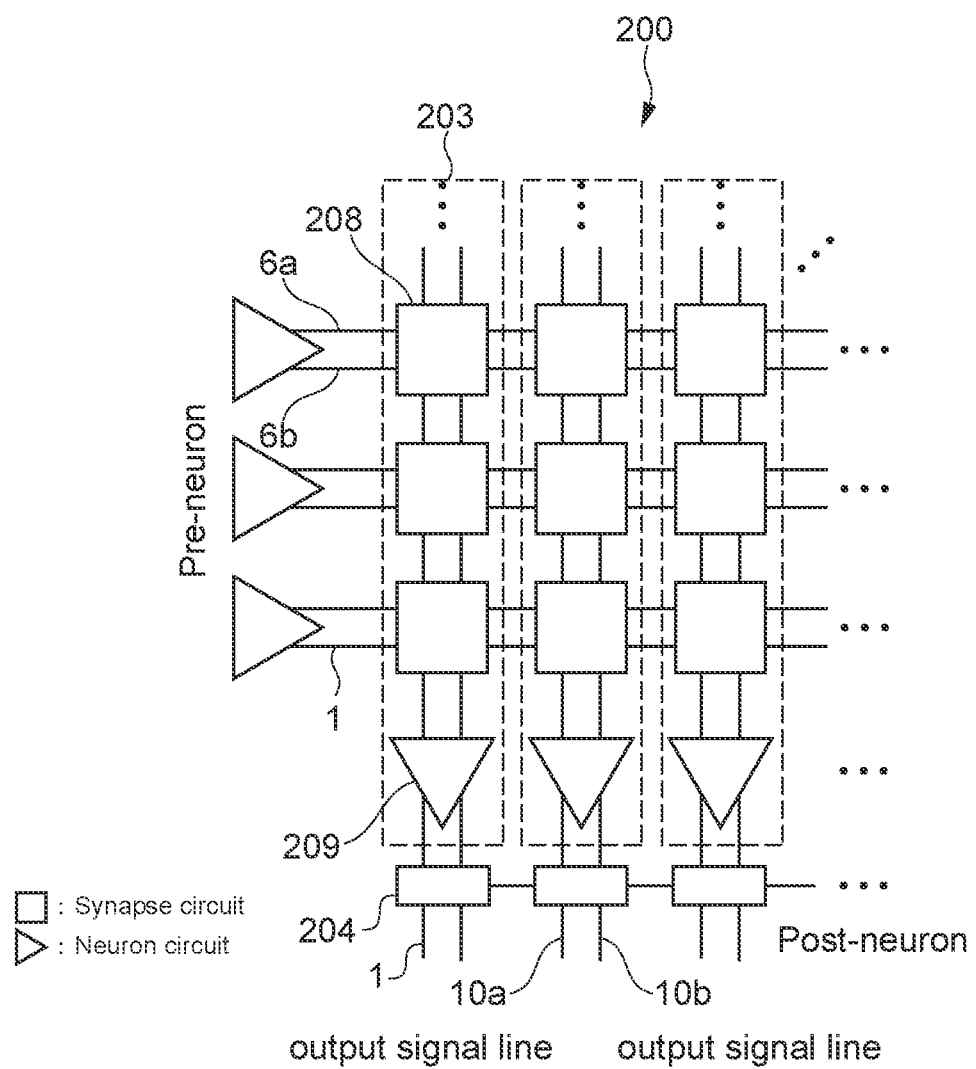
FIG. 18 is a schematic diagram showing a configuration example of an arithmetic logic unit according to a second embodiment.

FIG. 18 is a schematic diagram showing a configuration example of the arithmetic logic unit 200 according to the second embodiment. The arithmetic logic unit 200 includes a plurality of analog circuits 203 and a plurality of signal limiting circuits 204. Each of the analog circuits 203 is configured similarly to the analog circuit 3 described with reference to FIG. 3, for example. Note that the analog circuit 203 shown in FIG. 18 is, for example, the analog circuit 203 included in the intermediate layer.

The signal limiting circuit 204 is a circuit that limits the value range of the signal value. The signal limiting circuit 204 is provided on, for example, a signal line (the positive and negative input signal lines 6a and 6b/the positive and negative output signal lines 10a and 10b) connecting the analog circuits 203 in the preceding stage and the subsequent stage. The value of the signal value transmitted in this signal line 1 is limited by the signal limiting circuit 204.

In the example shown in FIG. 18, the plurality of signal limiting circuits 204 connected to the output side of the intermediate layer are shown. The present technology is not limited thereto. The signal limiting circuits 204 may be provided on the input side of the intermediate layer (the output side of the pre-neuron).

As shown in FIG. 18, a multiply-accumulate signal (a positive multiply-accumulate signal and a negative multiply-accumulate signal) representing a multiply-accumulate result $s_j$ calculated by the analog circuit 203 (output unit of a neuron circuit 209) is input to the signal limiting circuit 204. Here, the subscript j is an index indicating the analog circuit 203 included in the intermediate layer. In the following, assumption is made that the total number of the analog circuits 203 included in the intermediate layer is M. Therefore, the index j is an integer represented by j=(1, 2, . . . , M).

Further, the signal output from the signal limiting circuit 204 is input to the analog circuit 203 in a subsequent stage. Therefore, when viewed from the analog circuit 203 in the subsequent stage, the signal output from the signal limiting circuit 204 is the input signal, and the value represented by the input signal is the input value. That is, the signal limiting circuit 204 is a circuit that limits the input value input to the analog circuit 203 in the subsequent stage.

Hereinafter, the signal output from the signal limiting circuit 204 will be referred to as the subsequent-stage input signal, and the value represented by the subsequent-stage input signal will be referred to as the subsequent-stage input value $x_j$. Therefore, it can be said that the multiply-accumulate result $s_j$ input to the signal limiting circuit 204 is the value to be the subsequent-stage input value $x_j$. In this embodiment, the subsequent-stage input value $x_j$ is an example of the input value. Further, the signal limiting circuit 204 corresponds to the control unit.

The signal limiting circuit 204 executes the signal limitation processing of setting the subsequent-stage input value $x_j$ on the basis of the absolute value of the multiply-accumulate result $s_j$. As described above, the multiply-accumulate result $s_j$ is represented using a pair of positive and negative multiply-accumulate signals. In the signal limitation processing, the absolute value of the multiply-accumulate result $s_j$ is referred to from the positive and negative multiply-accumulate signals, and the value of the subsequent-stage input value $x_j$ is set on the basis of the absolute value thereof.

As described above, the signal limiting circuit 204 executes the signal limitation processing on the basis of the multiply-accumulate signal output from the output unit of the neuron circuit 209. In this embodiment, the absolute value of the multiply-accumulate result $s_j$ (the absolute value of the sum of multiplication values) corresponds to the second value, and the signal limitation processing corresponds to the second processing.

As an example of the signal limitation processing, processing of setting the subsequent-stage input values $x_j$ having the number defined by the second ratio to zero is executed in order from the smallest absolute value of the multiply-accumulate result $s_j$, of the multiply-accumulate results $s_j$ output from M analog circuits 203. That is, of the M subsequent-stage input values $x_j$, those having smaller absolute values of the original values (multiply-accumulate result $s_j$) are set to zero at the second ratio (e.g., 70% or 50%). As a result, it is possible to make the subsequent-stage input value $x_j$ having a smaller number sparse.

Note that the M subsequent-stage input signals (subsequent-stage input values $x_j$) are input to each of the plurality of synapse circuits 208 provided in the analog circuit 203 in the subsequent stage. Therefore, it can be also said that the above-mentioned signal limitation processing is processing of setting the subsequent-stage input value $x_j$ at the second ratio in order from the smallest absolute value of the multiply-accumulate result $s_j$ to zero, the subsequent-stage input value $x_j$ being represented by the subsequent-stage input signal input to each of the plurality of synapse circuits 208.

In the signal limiting circuit 204, for example, the difference value $|t_v^- - t_v^+|$ of the timing represented by the positive and negative multiply-accumulate signals is calculated as the absolute value of the multiply-accumulate result $s_j$. Specifically, a pulse signal (electrical signal) or the like of the TACT system representing the difference value by a pulse timing or the like is generated.

The timings of the pulse signals generated by the respective signal limiting circuits 204 are compared to each other, and pulse signals having the number corresponding to the second ratio are set to zero in order from the smallest difference value. For example, the wire of the target pulse signal is switched to OFF. Alternatively, a signal representing zero is output instead. As a result, it is possible to set the subsequent-stage input value $x_j$ to zero at the second ratio.

Note that the signal limiting circuit 204 is appropriately configured by using, for example, a logical circuit that calculates the above-mentioned difference value, a counter circuit that compares and counts timings, a switch circuit that switches ON/OFF of the wire, and the like. The specific configuration of the signal limiting circuit 204 is not limited.

Further, the processing of setting the subsequent-stage input value $x_j$ to zero when the absolute value of the multiply-accumulate result $s_j$ is a second threshold value d or less may be executed as another example of the signal limitation processing. For example, the signal limiting circuit 204 generates a pulse signal that represents the difference value $|t_v^- - t_v^+|$ (absolute value of the multiply-accumulate result $s_j$) of the timing, and threshold value processing using the second threshold value d is executed on the pulse timing. As a result, for example, in the case where it is determined that the difference value is the threshold value or less, the wire of the pulse signal is switched to OFF. For example, such processing is performed.

Thus, by appropriately configuring the signal limiting circuit 204, it is possible to implement desired signal limitation processing. As a result, it is possible to appropriately make the subsequent-stage input value $x_j$ input from the intermediate layer to the upper layer or the like in the subsequent stage sparse.

Note that as the subsequent-stage input value $x_j$ that is not set to zero, for example, the multiply-accumulate result $s_j$ is used as it is. That is, the positive and negative multiply-accumulate signals are output as the subsequent-stage input signals as they are. Alternatively, the subsequent-stage input value $x_j$ may be binarized to ±1 depending on the positive or negative sign of the multiply-accumulate result $s_j$. These subsequent-stage input values $x_j$ are substantial input values to the analog circuit 203 included in the upper layer.

As described above, the number of inputs is substantially reduced in the analog circuit 203 included in the upper layer. That is, since the number of input values that are zero is increased among the multiplication values of the input values and weight values, the number of multiplication values that are zero increases (see (Math. 1), etc.). As a result, it is possible to reduce the multiply-accumulate result calculated by the respective analog circuits 203 in the upper layer.

As a result, it is possible to improve the accuracy for expressing the multiply-accumulate result. Alternatively, it is possible to increase the magnitude of the difference value corresponding to the multiply-accumulate result. As a result, it is possible to detect an operation result or the like by the arithmetic logic unit 200 with high accuracy. As a result, it is possible to appropriately execute various types of processing using a time-axis analog multiply-accumulate operation.

Other Embodiments

The present technology is not limited to the embodiments described above, and various other embodiments can be realized.

In the above, the arithmetic logic unit 100 for which a weight value having a limited value range and the arithmetic logic unit 200 in which an input value having a limited value range is used has been described. The present technology is not limited thereto. An arithmetic logic unit for which a weight value having a limited value range is set and in which an input value having a limited value range is used may be configured. That is, both the weight value and the input value may be made sparse.

For example, both the weight value and the input value can be made sparse by setting a weight value or the like having a limited value range for the arithmetic logic unit 200 described with reference to FIG. 18. As a result, for example, it is possible to sufficiently suppress the multiply-accumulate result calculated by the respective analog circuits, and detect an operation result by the arithmetic logic unit with high accuracy.

In the above, the value ranges of the weight value and the input value have been limited using a plurality of limit values (±1, 0, and the like). The present technology is not limited thereto. For example, the value ranges of the weight value and the input value may be appropriately set so that the multiply-accumulate result calculated by the analog circuit is made small.

Five values, such as −1, −0.5, 0, +0.5, and +1, may be used as the plurality of limit values. For example, determination processing of setting the input value and the weight value to the respective limit values on the basis of the magnitude of the value that is the basis of the input value and the weight value may be executed. By setting the value ranges of the input value and the weight value in detail in this manner, it is possible to improve the processing accuracy by the arithmetic logic unit. It goes without saying that non-normalized discrete values such as ±3, ±2, ±1, and 0 may be used as the limit values. In addition, the method of setting the limit value is not limited.

Further, for example, the values of the weight value and the input value may be limited to fall within a predetermined range. For example, with reference to the absolute value of the value (pre-quantization weight or multiply-accumulate result) that is the basis of the weight value and the input value, processing of limiting the value having a smaller original value to fall within the range of −0.1 to +0.1 may be executed. As described above, even in the case where the weight value and the input value are limited to the consecutive value ranges, it is possible to reduce the multiply-accumulate result and the like, and improve the detection accuracy. For example, such processing may be executed.

In the above-mentioned embodiment, a time-axis analog multiply-accumulate operation using an electrical signal of the TACT system has been described. The system of the electrical signal is not limited. For example, an electrical signal of an arbitrary system capable of executing a time-axis analog multiply-accumulate operation may be used.

For example, an electrical signal of a pulse width modulation system (PWM) may be used as an electrical signal. The electrical signal of the PWM system is a signal representing the input value using a pulse width. Further, the pulse width of the electrical signal is typically set to fall within a predetermined input period. Thus, the accuracy of the input value represented by the electrical signal decreases with the increase in the input value. For example, even in the case where an electrical signal of a PWM system is used, the multiply-accumulate result and the like can be reduced by the making the above-mentioned weight value and input value sparse. As a result, it is possible to detect an operation result with high accuracy.

The configurations of the arithmetic logic unit, analog circuit, synapse circuit, neuron circuit, and the like, the method of limiting the weight value and input value, and the like described with reference to the drawings are merely one embodiment, and can be arbitrarily modified without departing from the essence of the present technology. That is, any other arbitrary configuration, method, and the like for carrying out the present technology may be employed.

A circuit that makes the weight value sparse (hereinafter, referred to as a weight limiting circuit) may be provided. The weight limiting circuit limits the value of the weight value set for the respective synapse circuits (multiplication units) of the analog circuit (multiply-accumulate operation device). The sparse processing by the weight limiting circuit is typically executed on a plurality of synapse circuits included in one analog circuit. The weight limiting circuit executes processing of limiting, for example, a plurality of pre-quantization weights $v_i$ calculated corresponding to the respective synapse circuits so as to be the weight values $w_i$ included in a predetermined value range.

For example, the weight limiting circuit calculates the absolute value of the input pre-quantization weight $v_i$, selects a predetermined number of weights in order from the smallest absolute value, and substitutes zero to the quantized weight value $w_i$ of the selected weight for outputting. Alternatively, the weight limiting circuit calculates the absolute value of the input pre-quantization weight $v_i$, and substitutes zero to the quantized weight value $w_i$ of the weight having an absolute value smaller than the threshold value d for outputting. The weight value $w_i$ output from the weight limiting circuit is set for the respective synapse circuits.

The specific configuration of the weight limiting circuit is not limited, and can be realized by, for example, appropriately combining a comparator, a logic element, a storage element, and the like. Further, the weight limiting circuit may be provided for each analog circuit, or may be configured as a common circuit for a plurality of analog circuits. In any case, as the weight limiting circuit, a circuit that makes the input weight (pre-quantization weight $v_i$) sparse and is capable of setting the obtained weight for each of the synapse circuits is used.

Further, in FIG. 18, the circuit (the signal limiting circuit 204) that makes the input value sparse has been described. Thus, a circuit (the signal limiting circuit and the weight limiting circuit) that makes the input value or weight value sparse can be used. These circuits limit the value of a value of at least one of the input value or the weight value before each of the plurality of synapse circuits provided in the analog circuit generates charges corresponding to the multiplication value. As a result, it is possible to detect an operation result with high accuracy. The signal limiting circuit and weight limiting circuit function as the limitation processing unit according to the present technology.

Further, as described with reference to FIG. 1 and the like, a plurality of analog circuits (multiply-accumulate operation devices) is connected to form a network circuit, thereby realizing a multiply-accumulate operation system. The above-mentioned signal limiting circuit and weight limiting circuit are each a circuit provided on the network circuit. Therefore, the input value and the weight value that been made sparse are input to the respective analog circuits through the network circuit. For example, the input value input to the analog circuit on the upper layer side is made sparse by the signal limiting circuit disposed on the lower layer side. Alternatively, the weight value of the analog circuit is made sparse by the weight limiting circuit suitably connected to the network circuit.

As described above, a value of at least one of the input value or the weight value is limited by the signal limiting circuit or the weight limiting circuit (limitation processing unit) via the network circuit. Thus, for example, by using the signal limiting circuit, the input value that has been made sparse is used in the actual operation even in the case where the input value that is not made sparse is input. Alternatively, by using the weight limiting circuit, a weight value that is appropriately made sparse can be set even in the case where the weight that has not been made sparse in advance is input. As a result, it is possible to realize an arithmetic logic unit with high accuracy of detecting an operation result and high versatility.

In the present disclosure, "same", "equal", "perpendicular", and the like are concepts including "substantially the same", "substantially equal", "substantially perpendicular", and the like. For example, the states included in a predetermined range (e.g., ±10%) with reference to "completely the same", "completely equal", "completely perpendicular", and the like are also included.

Out of the feature parts according to the present technology described above, at least two feature parts can be combined. That is, the various feature parts described in the respective embodiments may be arbitrarily combined without distinguishing from each other in the respective embodiments. It should be noted that the effects described above are merely illustrative and are not, and may have an additive effect.

It should be noted that the present technology may also take the following configurations.

(1) An arithmetic logic unit, including:
  a plurality of input lines, pulse signals corresponding to input values being input to the plurality of input lines; and
  a multiply-accumulate operation device that includes
    a plurality of multiplication units that generates, on a basis of the pulse signals input to each of the plurality of input lines, charges corresponding to multiplication values obtained by multiplying the input values by weight values, and
    an output unit that outputs a multiply-accumulate signal representing a sum of the multiplication values by accumulating the charges corresponding to the multiplication values generated by each of the plurality of multiplication units, in which
  a value of at least one of the input value or the weight value is limited.

(2) The arithmetic logic unit according to (1), in which
  the value of the at least one of the input value or the weight value is limited to fall within a predetermined value range.

(3) The arithmetic logic unit according to (2), in which
  the predetermined value range includes a plurality of limit values, and
  the value of the at least one of the input value or the weight value is set to one of the plurality of limit values.

(4) The arithmetic logic unit according to (3), in which
  the plurality of limit values includes zero.

(5) The arithmetic logic unit according to (3) or (4), in which
  the plurality of limit values includes a positive limit value and a negative limit value that have absolute values equal to each other.

(6) The arithmetic logic unit according to any one of (1) to (5), in which
  the weight value is limited by first processing of setting the weight value on a basis of a first value that is an absolute value of a value to be the weight value.

(7) The arithmetic logic unit according to (6), in which
  the first processing is processing of setting, where the first value is a first threshold value or less, the weight value to zero.

(8) The arithmetic logic unit according to (6), in which
  the first processing is processing of setting the weight value to zero at a first ratio in order from the smallest first value, the weight value being set for each of the plurality of multiplication units.

(9) The arithmetic logic unit according to any one of (1) to (8), in which
  the input value is limited by second processing of setting the input value on a basis of a second value that is an absolute value of a value to be the input value.

(10) The arithmetic logic unit according to (9), in which
  the second processing is processing of setting, where the second value is a second threshold value or less, the input value to zero.

(11) The arithmetic logic unit according to (9), in which
  the second processing is processing of setting the input value to zero at a second ratio in order from the smallest second value, the input value being represented by the pulse signal input to each of the plurality of multiplication units.
(12) The arithmetic logic unit according to any one of (9) to (11), further including
a limiting unit that executes, using an absolute value of the sum of the multiplication values represented by the multiply-accumulate signal as the second value, the second limitation processing on a basis of the multiply-accumulate signal.
(13) The arithmetic logic unit according to any one of (1) to (12), in which
the pulse signal is input to each of the plurality of input lines within a predetermined input period, and
the output unit outputs a multiply-accumulate signal representing the sum of the multiplication values within a predetermined output period.
(14) The arithmetic logic unit according to any one of (1) to (13), in which
the input value is a value represented by a first input value and a second input value, and
the plurality of input lines includes a plurality of pairs of the input lines, each of the pairs including a first input line and a second input line, a first pulse signal representing the first input value being input to the first input line, a second pulse signal representing the second input value being input to the second input line.
(15) The arithmetic logic unit according to any one of (1) to (14), in which
the pulse signal is a signal representing the input value using at least one of timing of a pulse or a pulse width.
(16) A multiply-accumulate operation device, including:
a plurality of multiplication units that generates, on a basis of the pulse signals input to each of a plurality of input lines, charges corresponding to multiplication values obtained by multiplying the input values by weight values; and
an output unit that outputs a multiply-accumulate signal representing a sum of the multiplication values by accumulating the charges corresponding to the multiplication values generated by each of the plurality of multiplication units, in which
a value of at least one of the input value or the weight value is limited.
(17) A multiply-accumulate operation system, including:
a plurality of input lines, pulse signals corresponding to input values being input to the plurality of input lines;
a plurality of multiply-accumulate operation devices that includes
a plurality of multiplication units that generates, on a basis of the pulse signals input to each of the plurality of input lines, charges corresponding to multiplication values obtained by multiplying the input values by weight values, and
an output unit that outputs a multiply-accumulate signal representing a sum of the multiplication values by accumulating the charges corresponding to the multiplication values generated by each of the plurality of multiplication units; and
a network circuit configured by connecting the plurality of multiply-accumulate operation devices, in which
a value of at least one of the input value or the weight value is limited.

(18) A multiply-accumulate operation method, including:
inputting pulse signals corresponding to input values to a plurality of input lines;
generating, on a basis of the pulse signals input to each of the plurality of input lines, charges corresponding to multiplication values obtained by multiplying the input values by weight values;
outputting a multiply-accumulate signal representing a sum of the multiplication values by accumulating the charges corresponding to the multiplication values; and
limiting a value of at least one of the input value or the weight value.
(19) An arithmetic logic unit, including:
a plurality of input lines, pulse signals corresponding to input values being input to the plurality of input lines;
a multiply-accumulate operation device that includes
a plurality of multiplication units that generates, on a basis of the pulse signals input to each of the plurality of input lines, charges corresponding to multiplication values obtained by multiplying the input values by weight values, and
an output unit that outputs a multiply-accumulate signal representing a sum of the multiplication values by accumulating the charges corresponding to the multiplication values generated by each of the plurality of multiplication units; and
a limitation processing unit that limits a value of at least one of the input value or the weight value before each of the plurality of multiplication units generates charges corresponding to the multiplication values.
(20) A multiply-accumulate operation system, including:
a plurality of input lines, pulse signals corresponding to input values being input to the plurality of input lines;
a plurality of multiply-accumulate operation devices that includes
a plurality of multiplication units that generates, on a basis of the pulse signals input to each of the plurality of input lines, charges corresponding to multiplication values obtained by multiplying the input values by weight values, and
an output unit that outputs a multiply-accumulate signal representing a sum of the multiplication values by accumulating the charges corresponding to the multiplication values generated by each of the plurality of multiplication units;
a network circuit configured by connecting the plurality of multiply-accumulate operation devices; and
a limitation processing unit that limits a value of at least one of the input value or the weight value before each of the plurality of multiplication units generates charges corresponding to the multiplication values, in which
the value of the at least one of the input value or the weight value is limited by the limitation processing unit via the network circuit.

REFERENCE SIGNS LIST

1, 1a, 1b signal line
3, 3a to 3c, 203 analog circuit
6, 6a, 6b input signal line
8, 208 synapse circuit
9, 209 neuron circuit
10, 10a, 10b output signal line
11 accumulation unit 12 output unit
39 weight value data
100, 200 multiply-accumulate operation device
204 signal limiting circuit

The invention claimed is:

1. An arithmetic logic unit, comprising:
a plurality of input lines, pulse signals corresponding to each of a plurality of input values being input to the plurality of input lines; and
a multiply-accumulate operation device that includes
a plurality of multiplication circuits that respectively generate, on a basis of the pulse signals input to each of the plurality of input lines, charges corresponding to multiplication values obtained by multiplying a respective input value by a respective weight value, and
an output circuit that outputs a multiply-accumulate signal representing a sum of the multiplication values by accumulating the charges corresponding to the multiplication values generated by each of the plurality of multiplication circuits, wherein
a value of at least one of the respective input value or the respective weight value is limited.

2. The arithmetic logic unit according to claim 1, wherein the value of the at least one of the respective input value or the respective weight value is limited to fall within a predetermined value range.

3. The arithmetic logic unit according to claim 2, wherein the predetermined value range includes a plurality of limit values, and
the value of the at least one of the respective input value or the respective weight value is set to one of the plurality of limit values.

4. The arithmetic logic unit according to claim 3, wherein the plurality of limit values includes zero.

5. The arithmetic logic unit according to claim 3, wherein the plurality of limit values includes a positive limit value and a negative limit value that have absolute values equal to each other.

6. The arithmetic logic unit according to claim 1, wherein the respective weight value is limited by first processing of setting the respective weight value on a basis of a first value that is an absolute value of a value to be the respective weight value.

7. The arithmetic logic unit according to claim 6, wherein when the first value is a first threshold value or less, the respective weight value is set to zero.

8. The arithmetic logic unit according to claim 6, wherein the respective weight value is set to zero at a first ratio in order from the smallest first value, each respective weight value being set for each of the plurality of multiplication circuits.

9. The arithmetic logic unit according to claim 1, wherein the respective input value is limited by second processing of setting the respective input value on a basis of a second value that is an absolute value of a value to be the respective input value.

10. The arithmetic logic unit according to claim 9, wherein
when the second value is a second threshold value or less, the respective input value is set to zero.

11. The arithmetic logic unit according to claim 9, wherein
the respective input value is set to zero at a second ratio in order from the smallest second value, each respective input value being represented by a respective pulse signal input to each of the plurality of multiplication circuits.

12. The arithmetic logic unit according to claim 9, further comprising
a limiting circuit that executes, using an absolute value of the sum of the multiplication values represented by the multiply-accumulate signal as the second value, the second limitation processing on a basis of the multiply-accumulate signal.

13. The arithmetic logic unit according to claim 1, wherein
the pulse signal is input to each of the plurality of input lines within a predetermined input period, and
the output circuit outputs a multiply-accumulate signal representing the sum of the multiplication values within a predetermined output period.

14. The arithmetic logic unit according to claim 1, wherein
the respective input value is a value represented by a first input value and a second input value, and
the plurality of input lines includes a plurality of pairs of the input lines, each of the pairs including a first input line and a second input line, a first pulse signal representing the first input value being input to the first input line, a second pulse signal representing the second input value being input to the second input line.

15. The arithmetic logic unit according to claim 1, wherein
the pulse signal is a signal representing the respective input value using at least one of timing of a pulse or a pulse width.

16. A multiply-accumulate operation device, comprising:
a plurality of multiplication circuits that respectively generates, on a basis of the pulse signals input to each of a plurality of input lines, charges corresponding to multiplication values obtained by multiplying a respective input value by a respective weight value; and
an output circuit that outputs a multiply-accumulate signal representing a sum of the multiplication values by accumulating the charges corresponding to the multiplication values generated by each of the plurality of multiplication circuits, wherein
a value of at least one of the respective input value or the respective weight value is limited.

17. A multiply-accumulate operation system, comprising:
a plurality of input lines, pulse signals corresponding to input values being input to the plurality of input lines;
a plurality of multiply-accumulate operation devices that includes
a plurality of multiplication circuits that respectively generates, on a basis of the pulse signals input to each of the plurality of input lines, charges corresponding to multiplication values obtained by multiplying a respective input value by a respective weight value, and
an output circuit that outputs a multiply-accumulate signal representing a sum of the multiplication values by accumulating the charges corresponding to the multiplication values generated by each of the plurality of multiplication circuits; and
a network circuit configured by connecting the plurality of multiply-accumulate operation devices, wherein
a value of at least one of the respective input value or the respective weight value is limited.

18. A multiply-accumulate operation method, comprising:
inputting pulse signals corresponding to input values to a plurality of input lines;
generating, on a basis of the pulse signals input to each of the plurality of input lines, charges corresponding to multiplication values obtained by multiplying a respective input value by a respective weight value;
outputting a multiply-accumulate signal representing a sum of the multiplication values by accumulating the charges corresponding to the multiplication values; and
limiting a value of at least one of the respective input value or the respective weight value.

19. An arithmetic logic unit, comprising:
a plurality of input lines, pulse signals corresponding to input values being input to the plurality of input lines;
a multiply-accumulate operation device that includes
  a plurality of multiplication circuits that respectively generates, on a basis of the pulse signals input to each of the plurality of input lines, charges corresponding to multiplication values obtained by multiplying a respective input value by a respective weight value, and
  an output circuit that outputs a multiply-accumulate signal representing a sum of the multiplication values by accumulating the charges corresponding to the multiplication values generated by each of the plurality of multiplication circuits; and
a limitation processing circuit that limits a value of at least one of the respective input value or the respective weight value before each of the plurality of multiplication circuits generates charges corresponding to the multiplication values.

20. A multiply-accumulate operation system, comprising:
a plurality of input lines, pulse signals corresponding to input values being input to the plurality of input lines;
a plurality of multiply-accumulate operation devices that includes
  a plurality of multiplication circuits that respectively generates, on a basis of the pulse signals input to each of the plurality of input lines, charges corresponding to multiplication values obtained by multiplying a respective input value by a respective weight value, and
  an output circuit that outputs a multiply-accumulate signal representing a sum of the multiplication values by accumulating the charges corresponding to the multiplication values generated by each of the plurality of multiplication circuits;
a network circuit configured by connecting the plurality of multiply-accumulate operation devices; and
a limitation processing circuit that limits a value of at least one of the input value or the weight value before each of the plurality of multiplication circuits generates charges corresponding to the multiplication values, wherein
the value of the at least one of the respective input value or the respective weight value is limited by the limitation processing circuit via the network circuit.

* * * * *